US012687905B2

(12) United States Patent　　　　(10) Patent No.: US 12,687,905 B2
Yoo et al.　　　　　　　　　　　　　(45) Date of Patent:　　　Jul. 21, 2026

(54) NETWORK DEVICE WITH DYNAMIC POWER MANAGEMENT

(71) Applicant: Cisco Technology, Inc., San Jose, CA (US)

(72) Inventors: Jaehwa Yoo, Milpitas, CA (US); Tuchih Tsai, Cupertino, CA (US); Luis Saavedra, Cupertino, CA (US)

(73) Assignee: Cisco Technology, Inc., San Jose, CA (US)

( * ) Notice:　　Subject to any disclaimer, the term of this patent is extended or adjusted under 35 U.S.C. 154(b) by 64 days.

(21) Appl. No.: 18/773,447

(22) Filed:　　Jul. 15, 2024

(65)　　　　　　Prior Publication Data

US 2026/0016874 A1　　Jan. 15, 2026

(51) Int. Cl.
G06F 1/26　　　　　(2006.01)
(52) U.S. Cl.
CPC ...................................... G06F 1/26 (2013.01)
(58) Field of Classification Search
CPC .......................................................... G06F 1/26
See application file for complete search history.

(56)　　　　　　　References Cited

U.S. PATENT DOCUMENTS 8,631,411 B1 * 　1/2014　Ghose ..................... G06F 1/206
　　　　　　　　　　　　　　　　　　　　713/320
9,874,923 B1 * 　1/2018　Brown .................. G06F 1/3234
11,050,294 B1 　6/2021　Majd et al.
11,243,601 B1 * 　2/2022　Hartwell ................... G06F 1/28

2007/0241732 A1 * 10/2007　Luo ..................... H02M 3/1584
　　　　　　　　　　　　　　　　　　　　323/281
2009/0307514 A1 * 12/2009　Roberts ................. G06F 1/3203
　　　　　　　　　　　　　　　　　　　　713/330
2010/0077238 A1 * 3/2010　Vogman ............... G06F 1/3296
　　　　　　　　　　　　　　　　　　　　713/340

(Continued)

FOREIGN PATENT DOCUMENTS

WO　　　　2023152749 A1　2/2023

OTHER PUBLICATIONS

International Search Report and Written Opinion for International Application No. PCT/US2025/036626, mailed Oct. 17, 2025, 14 Pages.

*Primary Examiner* — Faisal M Zaman
(74) *Attorney, Agent, or Firm* — Rutan & Tucker, LLP; Ravi Mohan; Marc A. McClain

(57)　　　　　　ABSTRACT

Devices, systems, methods, and processes for dynamic power management in network devices are described herein. Power consumption in network devices may fluctuate due to varying load conditions, leading to inefficiency if all power supply units (PSUs) in these network devices remain active all the time. To address this, a network device is provided with a power management logic that dynamically tunes a count of active PSUs in the network device based on a load demand handled by various PSUs in the network device. The power management logic may receive, from the PSUs, one or more load status signals indicating the load demand handled by the PSUs. Based on the one or more load status signals, the power management logic may determine whether to increase or decrease the count of active PSUs. Dynamically adjusting the count of active PSUs may enhance energy efficiency, reduce costs, and promote sustainability.

18 Claims, 10 Drawing Sheets

(56) References Cited

U.S. PATENT DOCUMENTS

| | | | |
|---|---|---|---|
| 2011/0302435 A1* | 12/2011 | Fang | H04W 52/0277 |
| | | | 713/320 |
| 2012/0068544 A1* | 3/2012 | Bushue | H02J 3/466 |
| | | | 307/80 |
| 2012/0151228 A1* | 6/2012 | Chao | G06F 1/3206 |
| | | | 713/300 |
| 2014/0359331 A1* | 12/2014 | Kuan | G06F 1/263 |
| | | | 713/323 |
| 2015/0082055 A1* | 3/2015 | Grout | G06F 1/263 |
| | | | 713/300 |
| 2015/0121113 A1 | 4/2015 | Ramamurthy et al. | |
| 2015/0249363 A1* | 9/2015 | Humphrey, Jr. | H02J 9/00 |
| | | | 307/44 |
| 2016/0282892 A1* | 9/2016 | Saavedra | G06F 1/263 |
| 2016/0313777 A1 | 10/2016 | Ragupathi et al. | |
| 2017/0357305 A1* | 12/2017 | Kunnathur Ragupathi | |
| | | | G06F 1/3206 |
| 2018/0059754 A1* | 3/2018 | Shaikh | G06F 1/189 |
| 2018/0358807 A1* | 12/2018 | Yamada | H02J 1/102 |
| 2020/0241616 A1* | 7/2020 | Eleftheriadis | H02J 1/10 |
| 2021/0194354 A1* | 6/2021 | Hsiao | H02M 1/08 |
| 2021/0303059 A1* | 9/2021 | Wang | G06F 1/263 |
| 2021/0376722 A1* | 12/2021 | Tochitani | H02M 3/158 |
| 2022/0329149 A1* | 10/2022 | Fong | H02M 1/4208 |
| 2023/0126736 A1 | 4/2023 | Singh et al. | |
| 2024/0080359 A1* | 3/2024 | Lei | G06F 1/3206 |
| 2025/0007387 A1* | 1/2025 | Lee | H02J 7/35 |
| 2026/0016874 A1* | 1/2026 | Yoo | G06F 1/26 |

* cited by examiner

TOTAL AVAILABLE POWER

ACTUAL SYSTEM LOAD

TIME

POWER

700

RECEIVE ONE OR MORE PEAK EFFICIENCY LOAD THRESHOLDS — 710

DETECT A LOAD DEMAND ASSOCIATED WITH A PSU — 720

COMPARE THE LOAD DEMAND WITH THE ONE OR MORE PEAK EFFICIENCY LOAD THRESHOLDS — 730

GENERATE ONE OR MORE LOAD STATUS SIGNALS — 740

RECEIVE A MODE OPERATION SIGNAL — 750

OPERATE IN ONE OF AN ACTIVE MODE OR A STANDBY MODE — 760

800

NETWORK DEVICE WITH DYNAMIC POWER MANAGEMENT

The present disclosure relates to power management. More particularly, the present disclosure relates to dynamic power management in network devices.

BACKGROUND

Modern day devices (for example, network devices) often incorporate multiple power supply units (PSUs) to ensure redundancy, achieve load balancing, and enhance scalability and reliability. These PSUs play an important role in providing necessary electrical power to operate the device itself and any connected device (for example, Power over Ethernet "PoE" devices) it powers.

In real-world scenarios, power consumption of these devices can fluctuate significantly throughout their operation due to varying load demand stemming from, for example, internal device components or externally connected devices. Since the load demand fluctuates, maintaining all PSUs active at all times may result in inefficient operation. Operating PSUs at lower efficiency levels during periods of lower load demand can lead to wasted energy and decreased overall system performance.

However, implementing power management strategies presents several challenges for multi-PSU devices. For example, prediction of load demand fluctuations can be complex, requiring sophisticated algorithms, and data analysis. Additionally, coordinating the activation and deactivation of PSUs without causing disruptions to device operation can pose a significant technical hurdle.

SUMMARY OF THE DISCLOSURE

Systems and methods for facilitating dynamic power management in accordance with embodiments of the disclosure are described herein. In many embodiments, a device includes a processor, a plurality of power supply units (PSUs) each operable in one of an active mode or a standby mode, a memory communicatively coupled to the processor, and a power management logic. The power management logic is configured to receive one or more load status signals from the plurality of PSUs and tune a count of active mode PSUs among the plurality of PSUs based on the one or more load status signals. The one or more load status signals are configured to indicate a load demand.

In a number of embodiments, tuning the count of active mode PSUs include one of increasing the count of active mode PSUs or decreasing the count of active mode PSUs.

In a variety of embodiments, the count of active mode PSUs is increased based on the one or more load status signals indicating that the load demand is greater than a peak efficiency load threshold.

In more embodiments, the count of active mode PSUs is decreased based on the one or more load status signals indicating that the load demand is less than a peak efficiency load threshold.

In further embodiments, the load demand corresponds to a real-time load demand or a near-real-time load demand.

In additional embodiments, the one or more load status signals include at least one of a high-load signal or a low-load signal.

In several embodiments, the high-load signal is configured to indicate that the real-time load demand or the near-real-time load demand is greater than a peak efficiency load threshold.

In numerous embodiments, the low-load signal is configured to indicate that the real-time load demand or the near-real-time load demand is less than a peak efficiency load threshold.

In many further embodiments, to tune the count of active mode PSUs, the power management logic is further configured to detect that the high-load signal has transitioned from a first state to a second state and trigger, in response to the high-load signal transitioning from the first state to the second state, at least one standby PSU among the plurality of PSUs to operate in the active mode.

In many additional embodiments, to tune the count of active mode PSUs, the power management logic is further configured to detect that the low-load signal has transitioned from a first state to a second state and trigger, in response to the low-load signal transitioning from the first state to the second state, at least one active PSU among the plurality of PSUs to operate in the standby mode.

In still more embodiments, the power management logic is further configured to determine mode oscillation information associated with the plurality of PSUs and set one or more peak efficiency load thresholds based on the mode oscillation information.

In yet more embodiments, the mode oscillation information indicates a number of times a PSU among the plurality of PSUs has oscillated between the active mode and the standby mode within a set time period.

In still yet more embodiments, the power management logic is further configured to provide the one or more peak efficiency load thresholds to the plurality of PSUs.

In numerous additional embodiments, the one or more peak efficiency load thresholds are configured to define a peak efficiency load threshold range.

In several more embodiments, the plurality of PSUs is associated with unique one or more peak efficiency load thresholds.

In several additional embodiments, a device includes a processor and a memory communicatively coupled to the processor. The memory comprises a power management logic that is configured to generate one or more load status signals based on a load demand and one or more peak efficiency load thresholds associated with the device. The power management logic is further configured to receive a mode trigger signal in response to the generation of the one or more load status signals and operate in one of an active mode or a standby mode based on the mode trigger signal.

In still further embodiments, the power management logic is further configured to receive the one or more peak efficiency load thresholds.

In still additional embodiments, the one or more peak efficiency load thresholds are dynamically programmable.

In further additional embodiments, a method includes receiving one or more load status signals from a plurality of power supply units (PSUs) in a network device and tuning a count of active mode PSUs among the plurality of PSUs based on the one or more load status signals. The one or more load status signals are configured to indicate a load demand.

In still yet additional embodiments, tuning the count of active mode PSUs includes one of: increasing the count of active mode PSUs based on the one or more load status signals indicating that the load demand is greater than a first peak efficiency load threshold or decreasing the count of active mode PSUs based on the one or more load status signals indicating that the load demand is less than a second peak efficiency load threshold.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
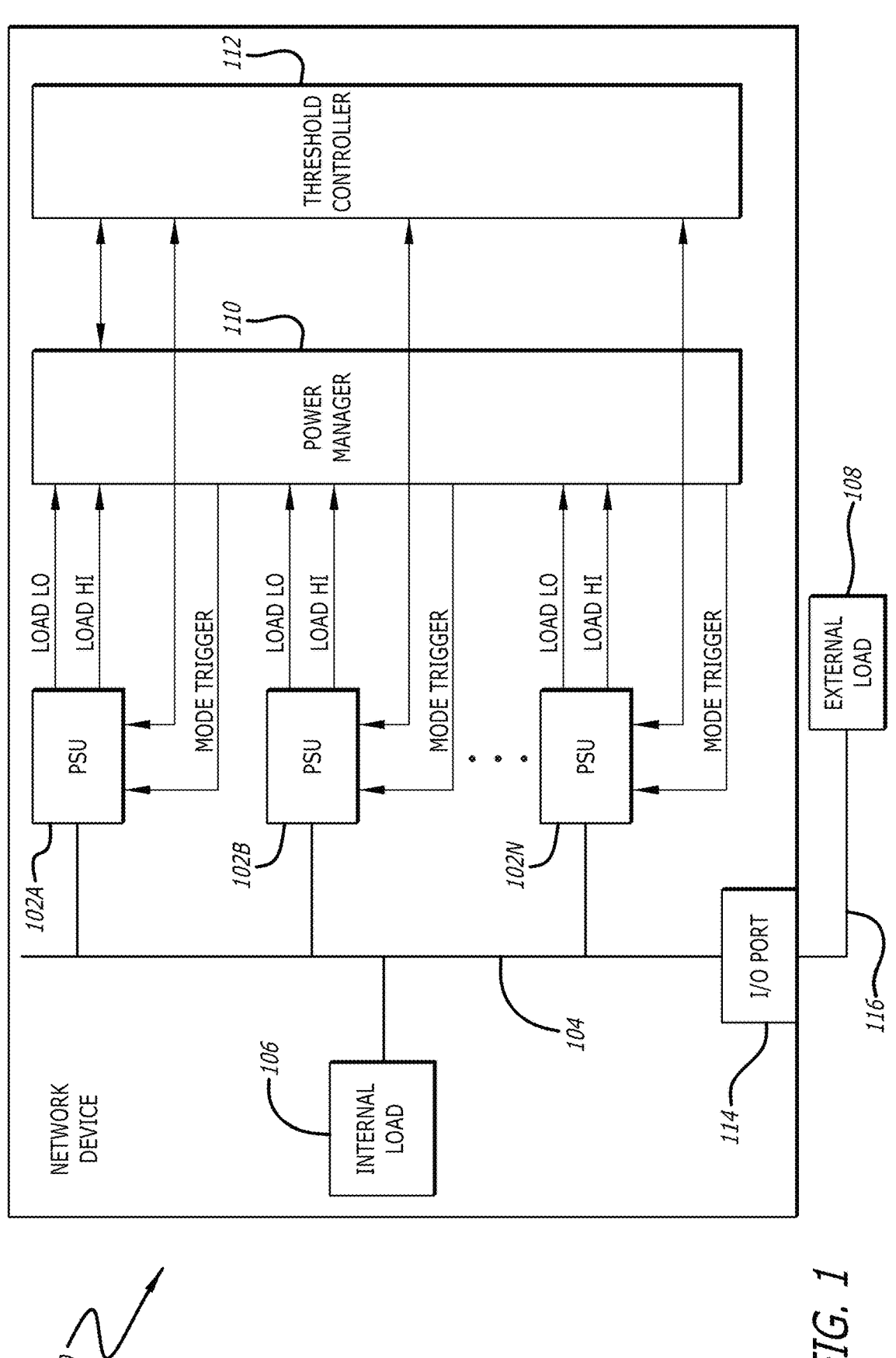
FIG. 1 is a schematic block diagram of an example network device with dynamic power management capability in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that can facilitate dynamic power management of multiple Power Supply Units (PSUs) in a device according to fluctuating load demand. Modern-day devices (for example, network devices) often incorporate multiple PSUs to ensure redundancy, achieve load balancing, and enhance scalability and reliability. These PSUs play an important role in providing necessary electrical power to operate the device itself and any connected device (for example, Power over Ethernet "PoE" devices or other peripheral devices) it powers. In real-world scenarios, power consumption of the device can fluctuate due to varying load demand arising from, for example, internal device components and/or the connected devices. The load demand can depend on various factors, for example, a number of connected devices, the type of data being processed, and the overall activity level of the device.

Since the load demand fluctuates, maintaining all PSUs active at all times may result in inefficient operation of the device. However, implementing power management strategies presents several challenges for multi-PSU devices. For example, prediction of load demand fluctuations can be complex, requiring sophisticated algorithms, and data analysis. Even if such sophisticated algorithms are built and put to use, unpredictable load variation can be a risk. Additionally, latency exhibited by Power Management Bus (PMBus) interface connecting the PSUs and device controller (e.g., a central processing unit) can hinder rapid adjustments in the PSUs to fluctuating load demand conditions. As a result, the ability of conventional devices to promptly adapt their power supply configuration to match fluctuating load demands is limited, potentially leading to suboptimal power utilization and efficiency. The present disclosure provides a network device that can facilitate dynamic power management of PSUs according to fluctuating load demand, thus offering a solution for abovementioned issues.

In many embodiments, a network device may include a plurality of PSUs for supplying power to internal device components and/or external devices powered by the network device. An amount of power supplied by each PSU may be based on a load demand arising from the internal device components and/or the externally connected devices. A PSU among the plurality of PSUs may be configured with at least two modes of operation, for example, an active mode and a standby mode. In other words, each of the plurality of PSUs may be operable in one of the active mode or the standby mode at any given time instance. In the active mode, a PSU may be configured to supply a certain amount of power based on its configuration and a current load demand. In the standby mode, a PSU may be configured to remain inactive or in a low power state. In other words, in the active mode, a PSU may supply power to the network device, while in the standby mode, the PSU may conserve energy. An active PSU may refer to a PSU operating in the active mode and a standby PSU may refer to a PSU operating in the standby mode. In several embodiments, an overall power supplied by the network device or consumed by the network device may be based on an aggregated power supplied by various active PSUs among the plurality of PSUs.

In several other embodiments, the network device may implement a power management logic for performing various tasks related to power supply management. The power management logic may facilitate swift reactions to load demand fluctuations by tuning a count of active PSUs. For example, the power management logic may be configured to determine a load demand associated with the network device, detect fluctuations in the load demand in real time or near real time, and dynamically increase or decrease the count of active PSUs in accordance with the load demand fluctuations. In other words, the power management logic may monitor and assess the load demand to ensure that the network device receives an adequate and stable power supply from the plurality of PSUs.

In numerous embodiments, the network device may include a power manager for implementing the power management logic. In numerous additional embodiments, the power manager can be implemented as a standalone device coupled to the network device. In more embodiments, the power management logic can be implemented within each PSU of the plurality of PSUs.

In a number of embodiments, the power management logic may receive one or more load status signals from the plurality of PSUs. For example, each PSU may generate the one or more load status signals to indicate whether the corresponding PSU is operating within a peak efficiency load threshold range defined by one or more peak efficiency load thresholds. In several more embodiments, an upper limit of the peak efficiency load threshold range may be defined by a first peak efficiency load threshold and a lower limit of the peak efficiency load threshold range may be defined by a second peak efficiency load threshold. The one or more load status signals may be configured to indicate whether a current load demand handled by the corresponding PSU is above the first peak efficiency load threshold, below the second peak efficiency load, or between the first peak efficiency load threshold and the second peak efficiency load.

In yet more embodiments, based on the one or more load status signals, the power management logic may be configured to tune a count of the active PSUs among the plurality of PSUs. This tuning may involve increasing or decreasing the number of active PSUs. For example, in response to the one or more load status signals indicating that the load demand has surpassed the first peak efficiency load threshold, the count of active mode PSUs may be increased to accommodate the higher power requirements. In response to the one or more load status signals indicating that the load demand is below the second peak efficiency load threshold, the count of active mode PSUs may be decreased to maintain optimal efficiency. The load demand can be real time or near real time, ensuring that the power management logic of the network device responds promptly to changes in power requirements.

In still more embodiments, the one or more load status signals may include, for example, a high-load signal and a low-load signal. The high-load signal can be in one of a first state or a second state. For example, the second state may correspond to an assertion state and the first state may correspond to a de-assertion state for the high-load signal. Likewise, the low-load signal can be in one of a third state or a fourth state. For example, the fourth state may correspond to an assertion state and the third state may correspond to a de-assertion state for the low-load signal. The term "assert" is used to mean placing a signal in an active state. Some signals may be assert-high signals whereas some signals may be assert-low signals. With assert-high signals, the assertion of a signal corresponds to the signal being in a logic high state. Conversely, with assert-low signals, the assertion of a signal corresponds to the signal being in a logic low state.

For a given load demand, if the high-load signal is in the first state and the low-load signal is in the third state for the plurality of PSUs, the power management logic may establish that a current count of active PSUs is optimal. However, if the power management logic detects that the high-load signal for any active PSU has transitioned from the first state to the second state, the power management logic may trigger at least one standby PSU among the plurality of PSUs to operate in the active mode. Likewise, if the power management logic detects that the low-load signal for any active PSU has transitioned from the third state to the fourth state, the power management logic may trigger at least one active PSU among the plurality of PSUs to operate in the standby mode. In many further embodiments, the power management logic may iteratively trigger one PSU at a time until the current count of active PSUs becomes optimal.

In numerous additional embodiments, the power management logic may set the one or more peak efficiency load thresholds based on a combination of configuration parameters of the network device and the plurality of PSUs. For example, the one or more peak efficiency load thresholds can be set based on a PSU design, a type of load, an operating environment, or the like.

In still additional embodiments, the one or more peak efficiency load thresholds may be dynamically programmable. The power management logic may refine the one or more peak efficiency load thresholds by analyzing mode oscillation information associated with the plurality of PSUs. The mode oscillation information of a PSU may indicate a number of times the PSU has oscillated between the active mode and the standby mode within a set time period. In an example, if a PSU oscillates between the active mode and the standby mode for more than 'n' times within the set time period (e.g., 1 minute, 5 minutes, 1 hour, etc.), the power management logic may determine that the first and second peak efficiency load thresholds are in close proximity, resulting in the PSUs' inability to stably settle in the active mode or the standby mode. Such rapid mode oscillations can introduce instability to the system (e.g., the network device and the connected devices). Thus, in further embodiments, the power management logic may reset the one or more peak efficiency load thresholds based on the mode oscillation information to fine tune the peak efficiency load threshold range. The one or more peak efficiency load thresholds can be same for the plurality of PSUs or unique for the PSUs.

In further additional embodiments, the plurality of PSUs may receive and store the one or more peak efficiency load thresholds. Each PSU (for example, active PSU) may compare a current load demand with the one or more peak efficiency load thresholds and generate the one or more load status signals to indicate whether the corresponding PSU is operating within the peak efficiency load threshold range defined by the one or more peak efficiency load thresholds. In an example, where the PSU determines that the current load demand is less than the first peak efficiency load threshold and greater than the second peak efficiency load threshold, the PSU may generate the high-load signal in the first state and the low-load signal in the third state. The high high-load signal in the first state and the low-load signal in the third state may represent a target operating region for the PSU. Further, where the PSU determines that the current load demand is greater than the first peak efficiency load threshold, the PSU may transition the high-load signal from the first state to the second state and the low-load signal may remain in the third state. The PSU may continue to generate the high-load signal in the second state until the current load demand falls below the first peak efficiency load threshold or the PSU starts operating in the standby mode. Furthermore, where the PSU determines that the current load demand is less than the second peak efficiency load threshold, the PSU may transition the low-load signal from the third state to the fourth state and the high-load signal may remain in the first state. The PSU may continue to generate the low-load signal in the fourth state until the current load demand exceeds the second peak efficiency load threshold or the PSU starts operating in the standby mode.

In response to the one or more load status signals, the plurality of PSUs may receive a mode trigger signal. The mode trigger signal may be configured to set a mode of operation of a PSU. For example, if a PSU receives the mode trigger signal in a fifth state, the PSU may operate in the active mode; however, if the PSU receives the mode trigger signal in a sixth state, the PSU may operate in the standby mode. The mode trigger signal may be generated by the power management logic to tune the count of active PSUs.

Thus, a network device that can adapt to fluctuating load demands can provide several advantages. By dynamically adjusting the number of active PSUs based on real-time or near real-time load conditions, the network device can enhance energy efficiency and reduce operational costs by minimizing unnecessary power consumption. This capability not only extends the lifespan of the electronic equipment of the network device but also enhances its reliability by ensuring sufficient power availability during peak demands. Additionally, scalable power management solutions offer flexibility for organizations to expand their infrastructure without requiring significant upgrades. Furthermore, by optimizing energy usage, the network device can contribute to reducing the carbon footprint of operations, aligning with sustainability goals. Overall, effective power management that can respond to load fluctuations plays an important role in enhancing operational efficiency, reducing costs, and promoting environmental stewardship.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like), or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer-readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in still yet more embodiments, may alternatively be embodied by or implemented as a component.

A circuit, as used herein, comprises a set of one or more electrical and/or electronic components providing one or more pathways for electrical current. In many additional embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to the ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of an example network device 100 with dynamic power management capability in accordance with various embodiments of the disclosure is shown. In many embodiments, the network device 100 may include a plurality of power supply units (PSUs) 102A-N (collectively referred to as "the PSUs 102") coupled to a power bus 104. The network device 100 may further include various functional electronic components (for example, line cards, network interface controllers, memory elements, input/output "I/O" ports 114, or the like) coupled to the power bus 104. The functional electronic components are collectively referred to as internal load 106. The network device 100 may be coupled to one or more powered devices, for example, to provide Power over Ethernet (PoE), via the I/O ports 114. The one or more powered devices are collectively referred to as external load 108. The network device 100 may further include a power manager 110 and a threshold controller 112.

Examples of the network device 100 may include switches, routers, hubs, data servers, or the like that may be configured to provide power and network connectivity to one or more powered devices. Examples of the one or more powered devices may include, but are not limited to, Internet Protocol (IP) cameras, wireless access points (APs), voice over internet protocol (VOIP) phones, user devices, end point devices, or the like.

In a variety of embodiments, the network device 100 may include any number of PSUs 102. In some examples, the PSUs 102 may be removable modules (e.g., field replaceable, hot-swappable device, etc) disposed within an opening of a chassis of the network device 100. In more examples, the PSUs 102 may be non-detachable modules disposed within the network device 100. In a number of embodiments, the PSUs 102 may include electronic circuitry that enable the PSUs 102 to receive power from one or more power sources such as a utility power grid, an Uninterruptible Power Source (UPS), a battery system, a renewable energy source (e.g., solar power panel, wind power panel, etc.), a non-renewable energy source, a back-up generator, or the like. The PSUs 102 may be electrically coupled to the power bus 104 to provide electrical power to the network device 100 and the external load 108. For example, the PSUs 102 may convert alternating current (AC) power from the one or more power sources into direct current (DC) power suitable for the internal load 106 and the external load 108. In more examples, the PSUs 102 can receive DC power from the one or more power sources.

In additional embodiments, the PSUs 102 may be operable in at least two modes of operation, for example, an active mode and a standby mode. In other words, at any given time instance, a PSU 102$_i$ may be operable in either the active mode or the standby mode. Here, the subscript "i" indicates that this operation may occur at any PSU 102A-N. In the active mode, the PSU 102$_i$ may be configured to supply certain amount of power based on its configuration. In the standby mode, the PSU $102_i$ may be configured to remain inactive or in a low power state. In other words, in the active mode, the PSU $102_i$ may supply power to the network device 100, while in the standby mode, the PSU $102_i$ may conserve energy. An active PSU may refer to a PSU operating in the active mode and a standby PSU may refer to a PSU operating in the standby mode. In further embodiments, power received by the power bus 104 may be based on an aggregated power supplied by various active PSUs among the PSUs 102.

In still more embodiments, the PSU $102_i$ may be configured to receive a mode trigger signal (e.g., denoted as "Mode_Trigger" in FIG. 1) from the power manager 110. The mode trigger signal may be configured to operate the PSU $102_i$ in one of the active mode or the standby mode. For example, some PSUs among the PSUs 102 may operate in the active mode and the remaining PSUs may operate in the standby mode based on corresponding mode trigger signals.

The PSU $102_i$ may be configured to store one or more peak efficiency load thresholds. The one or more peak efficiency load thresholds may define a peak efficiency load threshold range for the PSU 1021. Peak efficiency load may correspond to a range of loads at which a PSU exhibits the highest efficiency. The one or more peak efficiency load thresholds may include a first peak efficiency load threshold and a second peak efficiency load threshold. For example, an upper limit of the peak efficiency load threshold range may be defined by the first peak efficiency load threshold and a lower limit of the peak efficiency load threshold range may be defined by the second peak efficiency load threshold. In still further embodiments, the one or more peak efficiency load thresholds can be same for all the PSUs 102. In still additional embodiments, the one or more peak efficiency load thresholds can be unique for the PSUs 102. For example, the one or more peak efficiency load thresholds of the PSU 102A can be different from the one or more peak efficiency load thresholds of another PSU 102B.

In yet more embodiments, the PSU $102_i$ may be configured to detect a current load demand handled by the PSU $102_i$. For example, the PSU $102_i$ may detect the current load demand based on an amount of power provided by the PSU $102_i$ to the power bus 104. The current load demand may correspond to a real-time load demand or a near real-time load demand.

In still yet more embodiments, the PSU $102_i$ may be configured to generate one or more load status signals based on the current load demand handled by the PSU $102_i$. In some examples, the one or more load status signals may include a high-load status signal (e.g., denoted as "Load Hi" in FIG. 1) and a low-load status signal (denoted as "Load Lo" in FIG. 1). The high-load status signal can have a first state or a second state and the low-load status signal can have a third state or a fourth state based on the current load demand handled by the PSU $102_i$. The PSU $102_i$ may compare the current load demand with the one or more peak efficiency load thresholds. More specifically, the PSU $102_i$ may compare the current load demand with the first peak efficiency load threshold and the second peak efficiency load threshold and determine whether the PSU $102_i$ is operating within the peak efficiency load threshold range or outside the peak efficiency load threshold range.

In response to determining that the current load demand is less than the first peak efficiency load threshold and greater than the second peak efficiency load threshold, the PSU $102_i$ may generate the high-load signal in the first state and the low-load signal in the third state. The high high-load signal in the first state and the low-load signal in the third state may represent a target operating region for the PSU $102_i$. Further, in response to determining that the current load demand is greater than the first peak efficiency load threshold, the PSU $102_i$ may transition the high-load signal from the first state to the second state and the low-load signal may remain in the third state. The PSU $102_i$ may continue to generate the high-load signal in the second state until the current load demand falls below the first peak efficiency load threshold or the PSU $102_i$ starts operating in the standby mode. Furthermore, in response to determining that the current load demand is less than the second peak efficiency load threshold, the PSU $102_i$ may transition the low-load signal from the third state to the fourth state and the high-load signal may remain in the first state. The PSU $102_i$ may continue to generate the low-load signal in the fourth state until the current load demand exceeds the second peak efficiency load threshold or the PSU $102_i$ starts operating in the standby mode.

The power bus 104 may be configured to deliver the power supplied by the PSUs 102 to the internal load 106, and to the external load 108 via the I/O ports 114. In some examples, the I/O ports 114 may be PoE-enabled ports that deliver the power supplied by the PSUs 102 to the external load 108, for example, over Ethernet cables 116.

In many further embodiments, the power manager 110 may include suitable circuitry, logic, or interface to facilitate various operations for dynamic power management. In an example, the power manager 110 may include a processor and a memory. A power management logic may be implemented in the memory of the power manager 110 to facilitate dynamic power management. Examples of the power manager 110 may include, but are not limited to, an Application-Specific Integrated Circuit (ASIC) processor, a Reduced Instruction Set Computing (RISC) processor, a Complex Instruction Set Computing (CISC) processor, a Field-Programmable Gate Array (FPGA), a Digital Signal Processor (DSP), or the like. The power manager 110 may be coupled to the PSUs 102 and the threshold controller 112.

In many additional embodiments, the power manager 110 may be configured to receive the one or more load status signals from the PSUs 102. For example, the power manager 110 may receive the high-load status signal and the low-load status signal from each PSU 102. The power manager 110 may be further configured to tune a count of active PSUs among the PSUs 102 based on the one or more load status signals.

In an example, in response to receiving the high-load signal in the second state from any of the PSUs 102, the power manager 110 may generate the mode trigger signal in a manner that the count of active PSUs is increased. The count of active PSUs can be increased by triggering, via the mode trigger signal, one or more standby PSUs to operate in the active mode. For example, a PSU $102_i$ may operate in the standby mode based on the mode trigger signal being in a fifth state. However, a PSU $102_i$ may operate in the active mode based on the mode trigger signal being in a sixth state. Thus, in response to receiving the high-load signal in the second state from any of the PSUs 102, the power manager 110 may toggle the mode trigger signal from the fifth state to the sixth state to trigger one or more standby PSUs to operate in the active mode.

Further, in response to receiving the low-load signal in the fourth state from any of the PSUs 102, the power manager 110 may generate the mode trigger signal in a manner that the count of active PSUs is decreased. The count of active PSUs can be decreased by triggering, via the mode trigger signal, one or more active PSUs to operate in the standby mode. Thus, in response to receiving the low-load signal in the fourth state from any of the PSUs 102, the power manager 110 may toggle the mode trigger signal from the sixth state to the fifth state to trigger the one or more active PSUs to operate in the standby mode.

Furthermore, in response to receiving the low-load signal in the third state and the high-load signal in the first state from all the active PSUs among the PSUs 102, the power manager 110 may generate the mode trigger signal in a manner that the count of active PSUs does not change. In other words, active PSUs among the PSUs 102 may continue to receive the mode trigger in the sixth state and standby PSUs among the PSUs 102 may continue to receive the mode trigger in the fifth state.

In still yet further embodiments, the power manager 110 can iteratively trigger one PSU at a time until the current count of active PSUs becomes optimal, for example, until the power manager 110 receives the low-load signal in the third state and the high-load signal in the first state from all the active PSUs among the PSUs 102. In several embodiments, the power manager 110 can trigger more than one PSUs at a time to achieve an optimal count of active PSUs.

In still yet additional embodiments, a power management interface may be utilized by the power manager 110 to interface with the threshold controller 112. For example, the network device 100 may include a power management bus (PMBus) interface to provide communication between the power manager 110 and the threshold controller 112. In several additional embodiments, the power manager 110 may be configured to provide mode oscillation information to the threshold controller 112. The mode oscillation information of a PSU $102_i$ may indicate a number of times the PSU $102_i$ oscillated between the active mode and the standby mode within a set time period. In a variety of additional embodiments, the mode oscillation information may include mode oscillation details of all the PSUs 102.

In several more embodiments, the threshold controller 112 may include suitable logic, circuit, and/or interface to facilitate one or more operations of dynamically programming the one or more peak efficiency load thresholds in the PSUs 102. The threshold controller 112 may receive and analyze the mode oscillation information associated with the PSUs 102. Based on the analysis of the mode oscillation information, the threshold controller 112 may determine if a PSU $102_i$ has oscillated between the active mode and the standby mode for more than 'n' times within the set time-period (e.g., 1 minute, 5 minutes, 1 hour, etc.). Here, 'n' may define a mode oscillation threshold value which when breached may trigger the threshold controller 112 to refine the one or more peak efficiency load thresholds for the PSUs 102 or the PSU 1021. For example, if a PSU $102_i$ oscillates between the active mode and the standby mode for more than 'n' times within the set time-period (e.g., 1 minute, 5 minutes, 1 hour, etc.), the threshold controller 112 may determine that the first and second peak efficiency load thresholds are in close proximity and need to be updated. In scenarios where the first and second peak efficiency load thresholds are too close, the PSUs 102 may be unable to settle in the active mode or the standby mode for a longer duration. Such rapid mode oscillations can introduce instability to the system (e.g., the network device 100 and the connected devices).

In response to determining that the PSU $102_i$ has oscillated between the active mode and the standby mode for more than 'n' times within the set time-period, the threshold controller 112 may update the first and second peak efficiency load thresholds. For example, the threshold controller 112 may increase the first peak efficiency load threshold or decrease the second peak efficiency load threshold to increase a separation between the first and second peak efficiency load thresholds. Upon reset, the threshold controller 112 may provide the new first and second peak efficiency load thresholds to the PSUs 102. In numerous additional embodiments, the threshold controller 112 may update the first and second peak efficiency load thresholds for all PSUs 102. In further additional embodiments, the threshold controller 112 may selectively update the first and second peak efficiency load thresholds for some PSUs 102. For example, the threshold controller 112 may selectively update the first and second peak efficiency load thresholds for only those PSUs 102 that breached the mode oscillation threshold value.

In still yet numerous embodiments, a PSU $102_i$ may generate a single load status signal that can have any of a plurality of states, for example, a first state, a second state, and a third state. The single load status signal at the first state may indicate that the current load demand handled by the PSU $102_i$ is greater than the first peak efficiency load threshold. Further, the single load status signal at the second state may indicate that the current load demand handled by the PSU $102_i$ is less than the second peak efficiency load threshold. Furthermore, the single load status signal at the third state may indicate that the current load demand handled by the PSU $102_i$ is less than the first peak efficiency load threshold and greater than the second peak efficiency load threshold. Thus, the power manager 110 may generate the mode trigger signal based on the single load status signal.

In still yet further embodiments, the PSUs 102 may be associated with different domains. In such a scenario, each set of PSUs associated with a different domain is controlled separately.

Although a specific embodiment for an example network device with dynamic power management capability suitable for carrying out the various steps, processes, methods, and operations described herein is discussed with respect to FIG. 1, any of a variety of systems and/or processes may be utilized in accordance with embodiments of the disclosure. For example, in a variety of embodiments, functionalities of the power manager 110 and the threshold controller 112 can be integrated into a single component or logic without deviating from the scope of disclosure. The elements depicted in FIG. 1 may also be interchangeable with other elements of FIGS. 2-10 as required to realize a particularly desired embodiment.

Figure 2:
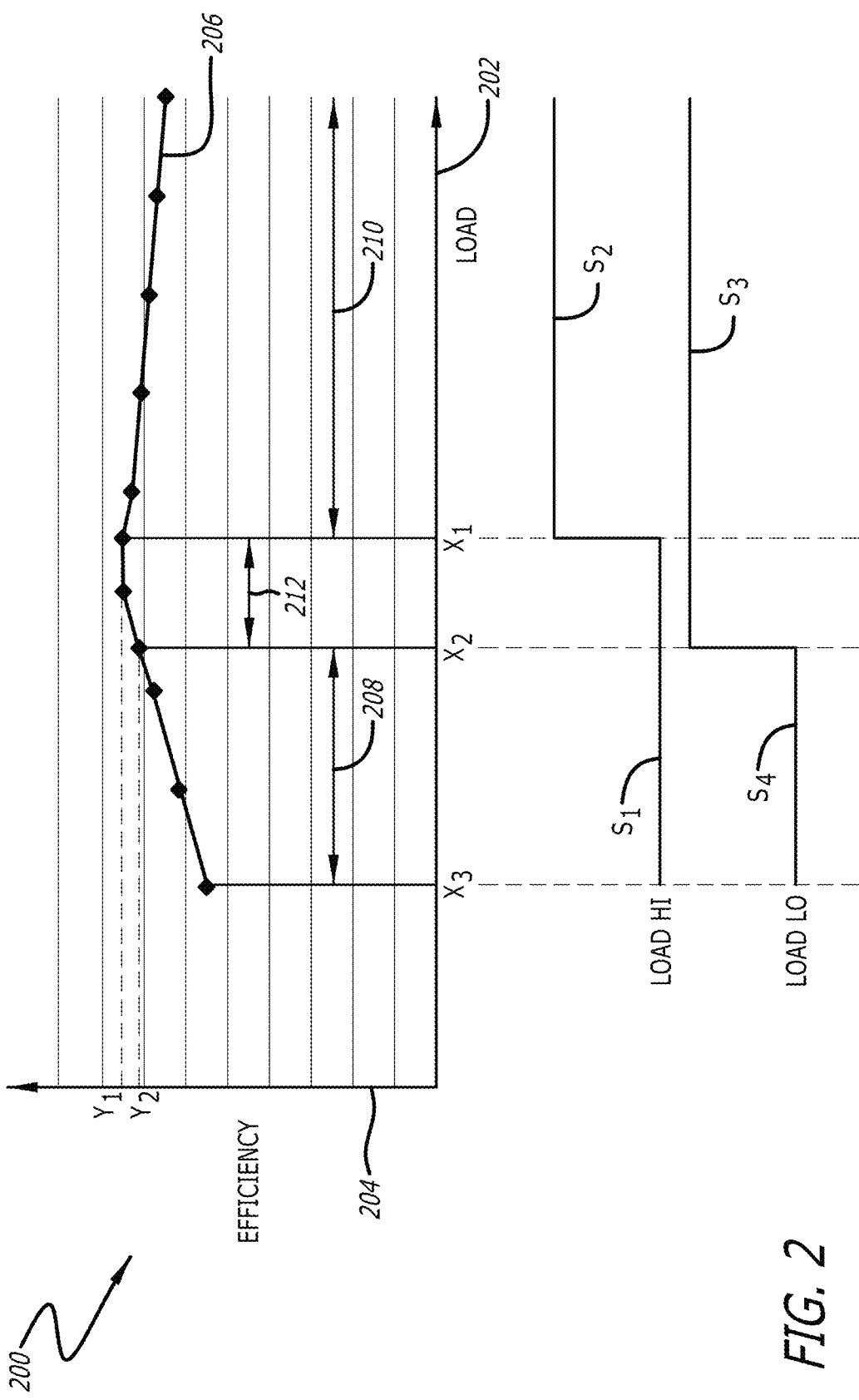
FIG. 2 is a conceptual diagram that illustrates generation of one or more load status signals by a PSU based on varying load demand in accordance with various embodiments of the disclosure.

Referring to FIG. 2, a conceptual diagram 200 that illustrates generation of one or more load status signals by a PSU based on varying load demand in accordance with various embodiments of the disclosure is shown. In many embodiments, a PSU in a network device may monitor a load demand handled by the PSU and generate one or more load status signals (e.g., denoted as "Load Hi" and "Load Lo" in FIG. 2) as per the monitored load demand. In a variety of embodiments, the one or more load status signals can be generated by the PSU while the PSU is operating in an active mode.

In an example depicted in FIG. 2, a load-efficiency graph is shown. X-axis 202 of the graph may depict the percentage load and Y-axis 204 of the graph may depict the percentage efficiency. Graph plot 206 may depict a relation between the percentage efficiency and the percentage load handled by the PSU. More specifically, the graph plot 206 may illustrate, for example, how efficiency of the PSU varies in response to fluctuations in load demand of the PSU. Load values $X_1$ and $X_2$ may represent the one or more peak efficiency load thresholds. For example, the load value $X_1$ may correspond to the first peak efficiency load threshold and the load value $X_2$ may correspond to the second peak efficiency load threshold. The load range defined by the load values $X_1$ and $X_2$ may correspond to the peak efficiency load threshold range. Further, the efficiency values $Y_1$ and $Y_2$ corresponding to the load values $X_1$ and $X_2$ may define a peak efficiency range of the PSU.

In a variety of embodiments, the one or more peak efficiency load thresholds may be set based on a required operational efficiency range of the PSU. For example, a power management logic implemented at the network device may identify the peak efficiency range of the PSU and load values that correspond to upper and lower limits of the peak efficiency range may be set as the one or more peak efficiency load thresholds. The one or more peak efficiency load thresholds can be dynamically programmed or updated based on any change in the peak efficiency range of the PSU.

The PSU may detect a load (e.g., load demand) currently handled by the PSU, compare the load with the one or more peak efficiency load thresholds, and generate one or more load status signals. In embodiments shown in FIG. 2, the one or more load status signals may include a high-load signal (denoted as "Load Hi" in FIG. 2) and a low-load signal (denoted as "Load Lo" in FIG. 2). The high-load signal can be in one of a first state $S_1$ or a second state $S_2$ based on the load. Likewise, the low-load signal can be in one of a third state $S_3$ or a fourth state $S_4$ based on the load.

In scenarios where the load is less than the second peak efficiency load threshold '$X_2$' (depicted by arrow 208), the PSU may generate the high-load signal in the first state $S_1$ and the low-load signal in the fourth state $S_4$. The power management logic upon receiving the low-load signal in the fourth state $S_4$ may trigger one or more active PSUs in the network device to operate in the standby mode. In an example, the fourth state $S_4$ may correspond to an assertion state and the third state $S_3$ may correspond to a de-assertion state for the low-load signal. Likewise, the second state $S_2$ may correspond to an assertion state and the first state $S_1$ may correspond to a de-assertion state for the high-load signal. The term "assert" may be used to mean placing a signal in an active state. As a result, the count of active PSUs may be decreased to prevent wastage of power. Since the load demand is shared among the active PSUs, any decrease in the count of active PSUs may redistribute the load demand among the remaining active PSUs. Consequently, the load handled per remaining active PSU may increase.

In scenarios where the load is greater than the first peak efficiency load threshold '$X_1$' (depicted by arrow 210), the PSU may generate the high-load signal in the second state $S_2$ and the low-load signal in the third state $S_3$. Likewise, the low-load signal can be in one of a third state or a fourth state. The power management logic upon receiving the high-load signal in the second state $S_2$ may trigger one or more standby PSUs in the network device to operate in the active mode. Since the load demand is shared among the active PSUs, any increase in the count of active PSUs may redistribute the load demand. Consequently, the load demand handled per active PSU may decrease.

In scenarios where the load is greater than the second peak efficiency load threshold '$X_2$' and less than the first peak efficiency load threshold '$X_1$' (depicted by arrow 212), the PSU may generate the high-load signal in the first state $S_1$ and the low-load signal in the third state $S_3$. The power management logic upon receiving the low-load signal in the third state $S_3$ and the high-load signal in the first state $S_1$ may maintain the same number of active PSUs in the network device. The load being greater than the second peak efficiency load threshold '$X_2$' and less than the first peak efficiency load threshold '$X_1$' may indicate an optimal operating region for the PSU.

Although a specific embodiment for generation of one or more load status signals by a PSU based on varying load demand is suitable for carrying out the various steps, processes, methods, and operations described herein is discussed with respect to FIG. 2, any of a variety of systems and/or processes may be utilized in accordance with embodiments of the disclosure. Although the high-load signal and the low-load signal are depicted as assert-high signals in FIG. 2, the scope of the disclosure is not limited to this configuration. For example, some signals may be assert-high signals whereas some signals can be assert-low signals. In additional embodiments, the high-load signal can be an assert-high signal whereas the low-load signal can be an assert-low signal. In further additional embodiments, the high-load signal can be an assert-low signal whereas the low-load signal can be an assert-high signal. In numerous additional embodiments, both the high-load signal and the low-load signal can be assert-low signals. The elements depicted in FIG. 2 may also be interchangeable with other elements of FIGS. 1 and 3-10 as required to realize a particularly desired embodiment.

Figure 3:
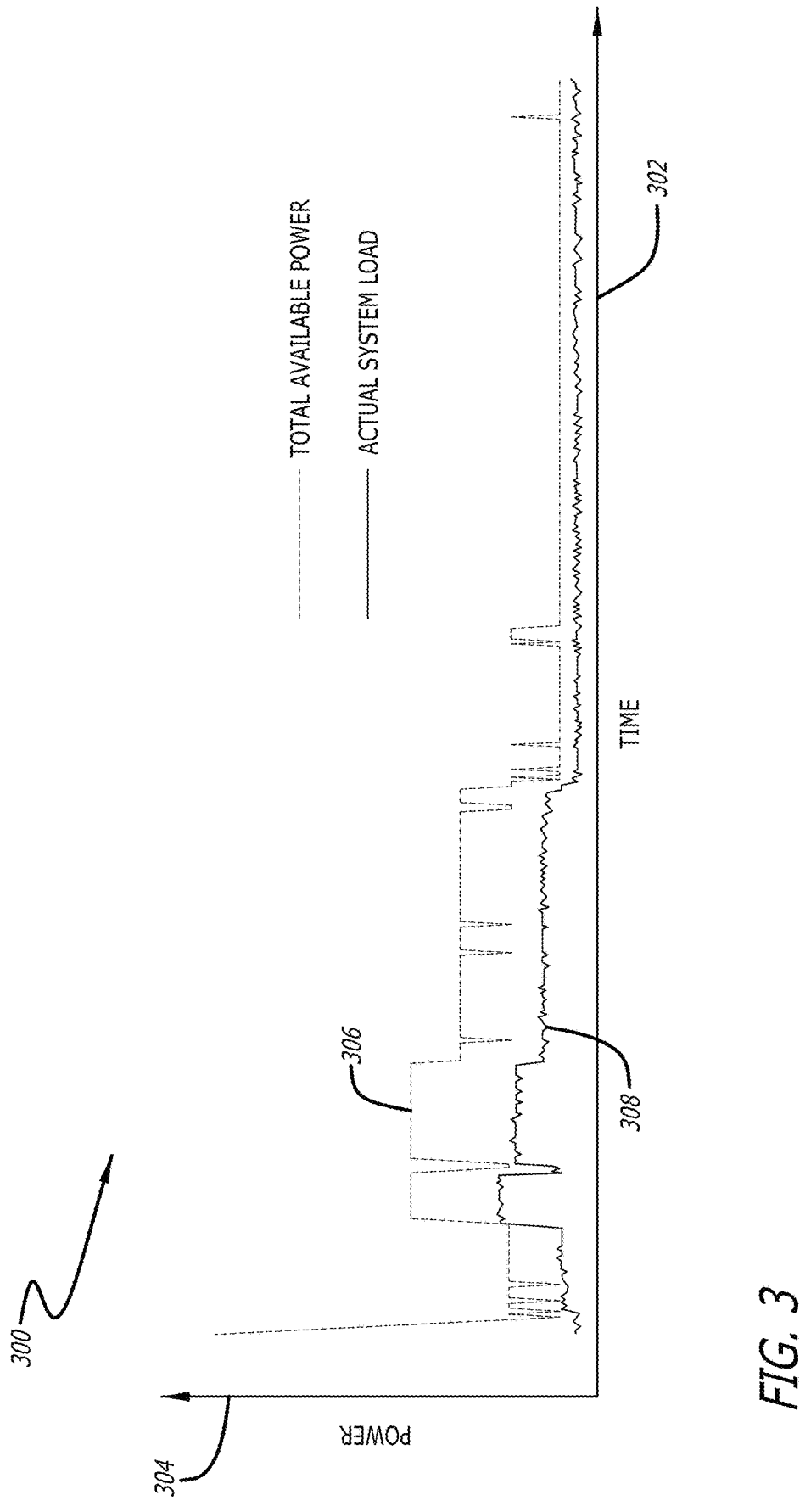
FIG. 3 is a conceptual diagram of a relation between total power available and load demand of a network device in accordance with various embodiments of the disclosure.

Referring to FIG. 3, a conceptual diagram 300 that illustrates a relation between total power available and load demand of a network device in accordance with various embodiments of the disclosure is shown. In an example, as depicted in FIG. 3, a time-power graph is shown. X-axis 302 of the time-power graph may depict time and Y-axis 304 of the time-power graph may depict power. A first graph plot 308 may depict fluctuations in load demand of a network device over a time-period. A second graph plot 306 may depict the total power available at the network device over the time-period.

As depicted in the conceptual diagram 300, the total power available of the network device is adjusted in accordance with the fluctuations in the load demand. For example, as depicted in FIG. 3, initially a power management logic implemented at the network device may operate all PSUs (e.g., PSUs 102 shown in FIG. 1) in an active mode resulting in a huge gap in the total power available and the load demand. However, as the network device continues to operate, the power management logic may receive one or more load signals from the PSUs of the network device and in response, the power management logic may tune a count of active PSUs (e.g., may reduce or increase the count of active PSUs) to match the load demand. Consequently, the total power available of the network device varies in accordance with the fluctuations in the load demand over time. In numerous embodiments, where the power management logic is implemented in an FPGA or a similar programmable logic device, the total available power of the network device can be adjusted, for example, within a short period of time such as within 5, 7, 10 nanoseconds.

Although a specific embodiment for illustrating a relation between total power available and load demand of a network device a variation of load demand and total power available over time suitable for carrying out the various steps, processes, methods, and operations described herein is discussed with respect to FIG. 3, any of a variety of systems and/or processes may be utilized in accordance with embodiments of the disclosure. For example, the network device tunes a count of the active PSUs to match with the load demand as the actual load demand changes dynamically by activating the active mode of multiple PSUs or by activating the standby mode of multiple PSUs at a time. In a non-limiting example, a network device having 8 PSUs, all the 8 PSUs can be activated once the Load Hi signal is received to increase power surge capacity to up to the load demand. The PSUs are brought back to the standby state once the load demand stabilizes. The elements depicted in FIG. 3 may also be interchangeable with other elements of FIGS. 1-2 and 4-10 as required to realize a particularly desired embodiment.

Figure 4:
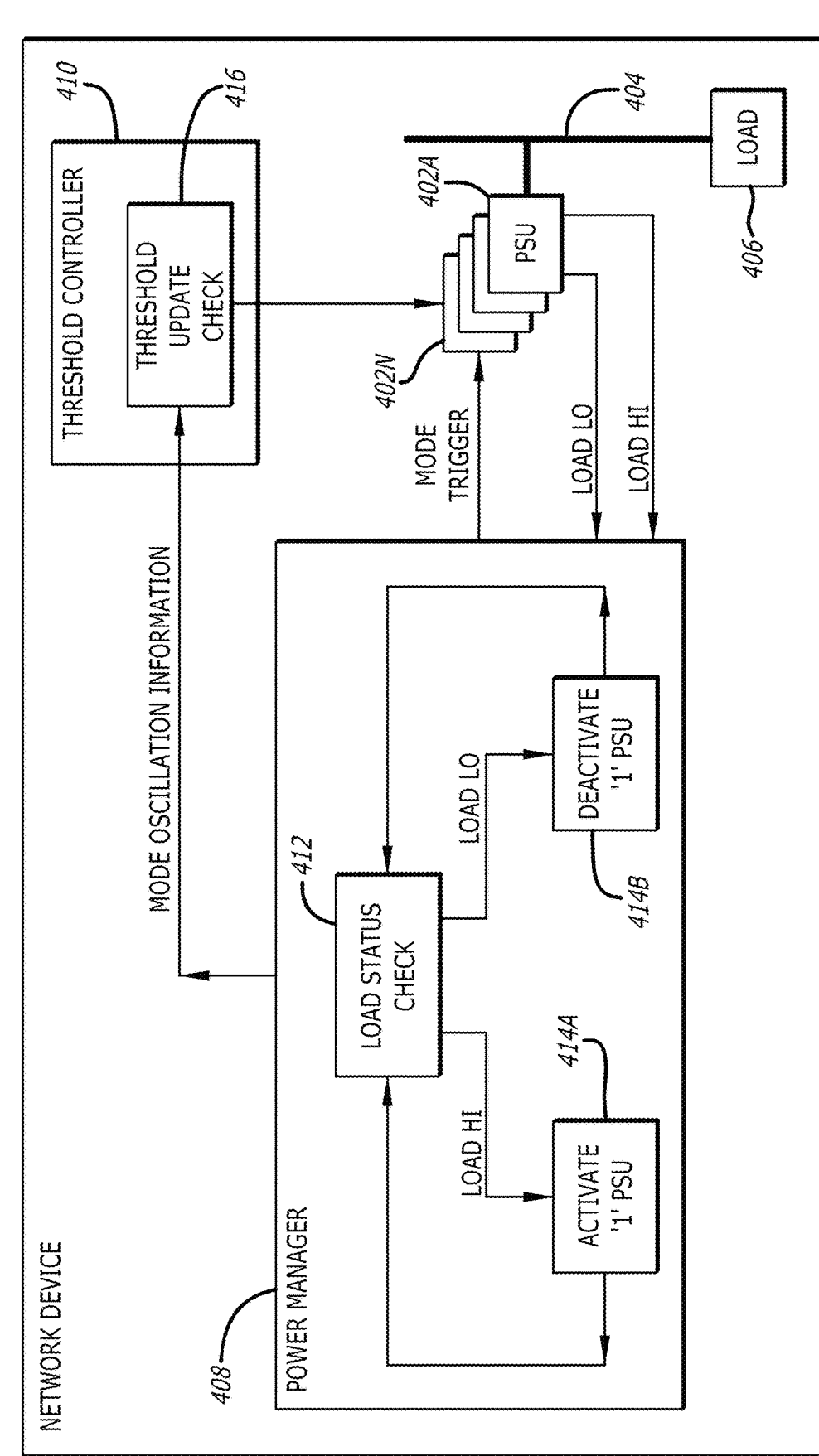
FIG. 4 is a conceptual diagram that illustrates activation and deactivation of PSUs and resetting of peak efficiency load thresholds in a network device in accordance with various embodiments of the disclosure.

Referring to FIG. 4, a conceptual diagram that illustrates activation and deactivation of PSUs and adjustment of peak efficiency load thresholds in a network device in accordance with various embodiments of the disclosure is shown. The embodiments shown in FIG. 4 illustrates a scenario where a network device 400 may include a plurality of PSUs 402A-N (collectively referred to as "the PSUs 402") coupled to a power bus 404. The network device 400 may further include various functional electronic components (for example, line cards, network interface controllers, memory elements, I/O ports, or the like) coupled to the power bus 404. The functional electronic components are collectively referred to as load 406. The network device 400 may further include a power manager 408 and a threshold controller 410.

In many embodiments, the PSUs 402 may include electronic circuitry that enables the PSUs 402 to receive power from one or more power sources and provide the electrical power to the load 406 and/or any external load connected to the network device 400. In a number of embodiments, the PSUs 402 may be operable in at least two modes of operation, for example, an active mode and a standby mode. In the active mode, a PSU (e.g., any of the PSUs 402) may power the load 406; however, in the standby mode, a PSU (e.g., any of the PSUs 402) may remain in a low power state and may not power the load 406. An active PSU may refer to a PSU operating in the active mode and a standby PSU may refer to a PSU operating in the standby mode. Further, power received by the power bus 404 may be based on an aggregated power supplied by various active PSUs among the PSUs 402.

In a variety of embodiments, a PSU 402$_i$ may be configured to store one or more peak efficiency load thresholds that define a peak efficiency load threshold range for the PSU 402$_i$. Here, the subscript "i" indicates that this operation may occur at any PSU 402A-N. Peak efficiency load may correspond to a range of loads at which the PSU 402$_i$ can exhibit the highest efficiency. The one or more peak efficiency load thresholds may include a first peak efficiency load threshold corresponding to an upper limit of the peak efficiency load threshold range and a second peak efficiency load threshold corresponding to a lower limit of the peak efficiency load threshold range.

In additional embodiments, the PSU 402$_i$ may receive threshold information, including the one or more peak efficiency load thresholds, from the threshold controller 410. In further embodiments, the one or more peak efficiency load thresholds can be same for all the PSUs 402. In still additional embodiments, the one or more peak efficiency load thresholds can be unique for the PSUs 402.

In more embodiments, the power manager 408 may be configured to manage a count of active PSUs in accordance with varying load demand, for example, real time load demand or near real time load demand. For example, if the count of active PSUs is to be increased, the power manager 408 may activate a standby PSU to operate it in the active mode. Further, if the count of active PSUs is to be decreased, the power manager 408 may deactivate an active PSU to operate it in the standby mode. In still more embodiments, the power manager 408 may activate or deactivate the PSUs 402 based on a mode trigger signal.

In yet more embodiments, the PSU 402$_i$ may detect a current load demand handled by the PSU 402$_i$ generate one or more load status signals based on the current load demand, and provide the one or more load status signals to the power manager 408. For example, the one or more load status signals may include a high-load status signal (e.g., denoted as "Load Hi" in FIG. 4) and a low-load status signal (denoted as "Load Lo" in FIG. 4). The high-load status signal can have a first state or a second state and the low-load status signal can have a third state or a fourth state. The PSU 402$_i$ may compare the current load demand with the first peak efficiency load threshold and the second peak efficiency load threshold and determine whether the PSU 402$_i$ is operating within the peak efficiency load threshold range or outside the peak efficiency load threshold range. In response to determining that the current load demand is less than the first peak efficiency load threshold and greater than the second peak efficiency load threshold, the PSU 402$_i$ may generate the high-load signal in the first state and the low-load signal in the third state. Further, in response to determining that the current load demand is greater than the first peak efficiency load threshold, the PSU 402$_i$ may transition the high-load signal from the first state to the second state and the low-load signal may remain in the third state. Furthermore, in response to determining that the current load demand is less than the second peak efficiency load threshold, the PSU 402$_i$ may transition the low-load signal from the third state to the fourth state and the high-load signal may remain in the first state.

In many additional embodiments, the power manager 408 may receive the one or more load status signals from the PSUs 402 and may execute a load status check (block 412). During the load status check, the power manager 408 determine whether the power manager 408 has received the high-load signal in the second state or the low-load signal in the fourth state. For example, the high-load signal in the second state may be configured to indicate that at least one of the active PSUs is operating at a load greater than the first peak efficiency load threshold. Further, the low-load signal in the fourth state may be configured to indicate that at least one of the active PSUs is operating at a load that is less than the second peak efficiency load threshold. If during the load status check the power manager 408 determines the high-load signal is in the second state or the low-load signal is in the fourth state, the power manager 408 may tune (e.g., increase or decrease) the count of active PSUs among the PSUs 402.

For example, if the power manager 408 receives the high-load signal in the second state, the power manager 408 may activate '1' standby PSU to increase the count of active PSUs (block 414A). To activate '1' standby PSU among the PSUs 402$_i$ the power manager 408 may toggle the mode trigger signal from a fifth state to a sixth state to trigger '1' standby PSU to operate in the active mode. In response to receiving the mode trigger signal in the sixth state, the standby PSU may start operating in the active mode. The power manager 408 can activate the standby PSU in less than 0.1 millisecond. Likewise, if the power manager 408 receives the low-load signal in the fourth state, the power manager 408 may deactivate '1' active PSU to decrease the count of active PSUs (block 414B). To deactivate '1' active PSU, the power manager 408 may toggle the mode trigger signal from the sixth state to the fifth state to trigger '1' active PSU to operate in the standby mode. In response to receiving the mode trigger signal in the fifth state, the active PSU may start operating in the standby mode. In other words, a PSU among the PSUs 402 may switch its mode of operation if the mode trigger signal toggles. In many further embodiments, the power manager 408 may execute one or more iterations for tuning the count of active PSUs until the high-load signal from the PSUs 402 is in the first state and the low-load signal from the PSUs 402 is in the third state.

In several embodiments, the power manager 408 may provide mode oscillation information of the PSUs 402 to the threshold controller 410. The mode oscillation information of a PSU $402_i$ may indicate an oscillation frequency of the PSU $402_i$. Oscillation frequency may indicate a number of times the PSU $402_i$ has oscillated between the active mode and the standby mode within a set time period.

In several more embodiments, the threshold controller 410 may analyze the mode oscillation information and perform a threshold update check (block 416). During the threshold update check, the threshold controller 410 may determine whether a PSU $402_i$ has oscillated between the active mode and the standby mode for more than 'n' times within a set time-period (e.g., 1 minute, 5 minutes, 1 hour, etc.). Here, 'n' may define a mode oscillation threshold value which when breached may trigger the threshold controller 410 to refine the one or more peak efficiency load thresholds for the PSUs 402 or the PSU $402_i$. In other words, during the threshold update check, the threshold controller 410 determines whether the oscillation frequency of any PSU 402 is greater than 'n'. A PSU $402_i$ having the oscillation frequency greater than 'n' may indicate that the first and second peak efficiency load thresholds are in close proximity and need to be updated. In scenarios where the first and second peak efficiency load thresholds are too close, the PSUs 402 may be unable to settle in the active mode or the standby mode for a longer duration.

In response to determining that the oscillation frequency of the PSU $402_i$ is greater than 'n', the threshold controller 410 may update (e.g., adjust) the first and second peak efficiency load thresholds. For example, the threshold controller 410 may increase the first peak efficiency load threshold or decrease the second peak efficiency load threshold to increase a separation between the first and second peak efficiency load thresholds. First and second peak efficiency load thresholds may exist as a function of varying input AC voltages. The threshold controller 410 may provide threshold information including the new first and second peak efficiency load thresholds to the PSUs 402.

In numerous additional embodiments, the threshold controller 410 may update the first and second peak efficiency load thresholds for all PSUs 402. In further additional embodiments, the threshold controller 410 may selectively update the first and second peak efficiency load thresholds for some PSUs 402. For example, the threshold controller 410 may selectively update the first and second peak efficiency load thresholds for only those PSUs 402 that have breached the mode oscillation threshold value.

Although a specific embodiment for illustrating activation and deactivation of PSUs and adjustment of peak efficiency load thresholds in a network device suitable for carrying out the various steps, processes, methods, and operations described herein is discussed with respect to FIG. 4, any of a variety of systems and/or processes may be utilized in accordance with embodiments of the disclosure. For example, a PSU may not have two separate output signal lines for providing the high-load status signal and the low-load status signal. In such embodiments, an output signal line for alerts can be repurposed to provide the high-load status signal and the power manager 408 can periodically monitor PSU activity log for load-low indication by any active PSU and take an action to deactivate one or more active PSUs. The elements depicted in FIG. 4 may also be interchangeable with other elements of FIGS. 1-3 and 5-10 as required to realize a particularly desired embodiment.

Figure 5:
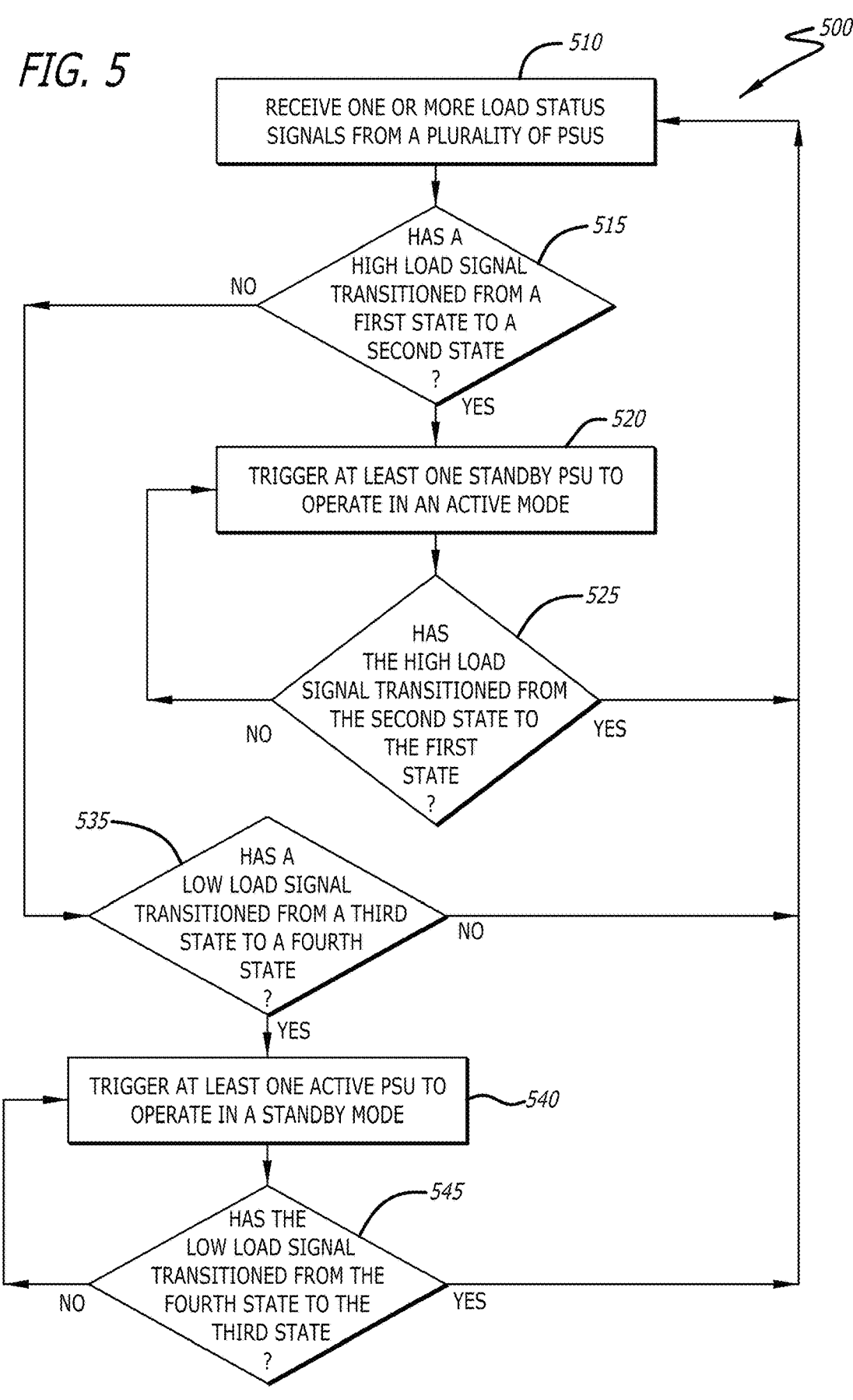
FIG. 5 is a flowchart showing a process for dynamic power control based on active PSU tuning in accordance with various embodiments of the disclosure.

Referring to FIG. 5, a flowchart showing a process 500 for dynamic power control based on active PSU tuning in accordance with various embodiments of the disclosure is shown. In many embodiments, the process 500 may receive one or more load status signals from a plurality of PSUs (block 510). In a variety of embodiments, the one or more load status signals may be configured to indicate a load demand. For example, the one or more load status signals may indicate whether the plurality of PSUs are experiencing a high load demand, a low load demand, or an optimal load demand. In a number of embodiments, the one or more load status signals may include a high-load signal and a low-load signal. The high-load signal can have a first state or a second state and the low-load signal can have a third state or a fourth state based on the load demand. In numerous embodiments, each of the plurality of PSUs may be configured to generate the one or more load status signals to indicate the load demand being handled by the corresponding PSU.

In additional embodiments, the process 500 may determine whether the high-load signal has transitioned from the first state to the second state (block 515). In further additional embodiments, the high-load signal at the first state may indicate that the load demand is less than a first peak efficiency load threshold and the high-load signal at the second state may indicate that the load demand is greater than the first peak efficiency load threshold. The first peak efficiency load threshold may define an upper limit of a peak efficiency load threshold range associated with the plurality of PSUs. In numerous additional embodiments, the high-load signal may transition from the first state to the second state when the load demand exceeds the first peak efficiency load threshold. For example, if the load demand being handled by a PSU exceeds the first peak efficiency load threshold, the high-load signal generated by such a PSU may transition from the first state to the second state. In other words, the high-load signal of those PSUs may transition from the first state to the second state for which the load demand has exceeded the first peak efficiency load threshold.

In several embodiments, if the high-load signal has transitioned from the first state to the second state, the process 500 may trigger at least one standby PSU to operate in an active mode (block 520). The at least one standby PSU may be triggered to operate in the active mode to increase a count of active PSUs among the plurality of PSUs. Since the load demand is shared among active PSUs, any increase in the count of active PSUs may redistribute the load demand among previously active PSUs and the newly activated PSU. Consequently, the load handled per active PSU may decrease. In several more embodiments, the process 500 may trigger one standby PSU to operate in the active mode in one iteration.

In still yet additional embodiments, the process 500 may determine whether the high-load signal has transitioned from the second state to the first state (block 525). In still yet further embodiments, the process 500 may perform this check to confirm whether the increased count active PSUs is sufficient to handle the current load demand or whether the count active PSUs requires further tuning.

In many additional embodiments, if the high-load signal has not transitioned from the second state to the first state, the process 500 may further trigger at least one standby PSU to operate in the active mode (block 520). For example, if the increased count of active PSUs is still not sufficient to handle the load demand, the high-load signal may not transition from the second state to the first state. In other words, if the load demand is still greater than the first peak efficiency load threshold after increasing the count of active PSUs, the high-load signal may not transition from the second state to the first state. In many further embodiments, if the high-load signal transitions from the second state to the first state, the process 500 may end the tuning and continue to receive the one or more load status signals from the plurality of PSUs (block 510). For example, if the increased count of active PSUs is sufficient to handle the load demand, the high-load signal may transition from the second state to the first state. In other words, if after increasing the count of active PSUs, the load demand becomes less than the first peak efficiency load threshold, the high-load signal may transition from the second state to the first state.

In many further embodiments, if the high-load signal has not transitioned from the first state to the second state, the process 500 may determine whether the low-load signal has transitioned from the third state to the fourth state (block 535). In still yet more embodiments, the low-load signal at the third state may indicate that the load demand is greater than a second peak efficiency load threshold and the low-load signal at the fourth state may indicate that the load demand is less than the second peak efficiency load threshold. The second peak efficiency load threshold may define a lower limit of the peak efficiency load threshold range associated with the plurality of PSUs. The low-load signal may transition from the third state to the fourth state when the load demand becomes less than the second peak efficiency load threshold. For example, if the load demand being handled by a PSU falls below the second peak efficiency load threshold, the low-load signal generated by such a PSU may transition from the third state to the fourth state. In other words, the low-load signal of those PSUs may transition from the third state to the fourth state for which the load demand has fallen below the second peak efficiency load threshold.

In yet more embodiments, if the low-load signal has not transitioned from the third state to the fourth state, the process 500 may end the tuning and continue to receive the one or more load status signals from the plurality of PSUs (block 510). For example, for the plurality of PSUs, if the high-load signal is at the first state and the low-load signal is at the third state, the process 500 may establish that the count of active PSUs is optimal for the current load demand and that all active PSUs are operating within their peak efficiency load threshold range.

In still additional embodiments, if the low-load signal has transitioned from the third state to the fourth state, the process 500 may trigger at least one active PSU to operate in the standby mode (block 540). The at least one active PSU may be triggered to operate in the standby mode to decrease the count of active PSUs among the plurality of PSUs. Since the load demand is shared among active PSUs, any decrease in the count of active PSUs may redistribute the load demand among the remaining active PSUs. Consequently, the load handled per active PSU may increase. In still further embodiments, the process 500 may trigger one active PSU to operate in the standby mode in one iteration.

In still more embodiments, the process 500 may determine whether the low-load signal has transitioned from the fourth state to the third state (block 545). The process 500 may perform this check to confirm whether the decreased count active PSUs is sufficient to handle the current load demand or whether the count active PSUs requires further tuning.

In further embodiments, if the low-load signal has not transitioned from the fourth state to the third state, the process 500 may further trigger at least one active PSU to operate in the standby mode (block 540). For example, if the active PSUs are still operating below the second peak efficiency load threshold, the low-load signal may not transition from the fourth state to the third state. In other words, if the load demand is still less than the second peak efficiency load threshold after decreasing the count of active PSUs, the low-load signal may not transition from the fourth state to the third state. In more embodiments, if the low-load signal transitions from the fourth state to the third state, the process 500 may end the tuning and continue to receive the one or more load status signals from the plurality of PSUs (block 510). For example, if the decreased count of active PSUs is sufficient to handle the load demand, the low-load signal may transition from the fourth state to the third state. In other words, if after decreasing the count of active PSUs, the load demand becomes greater than the second peak efficiency load threshold, the low-load signal may transition from the fourth state to the third state.

Although a specific embodiment for dynamic power control based on active PSU tuning suitable for carrying out the various steps, processes, methods, and operations described herein is discussed with respect to FIG. 5, any of a variety of systems and/or processes may be utilized in accordance with embodiments of the disclosure. For example, in many further embodiments, a PSU may generate a single load status signal that can have any of a plurality of states such as a first state, a second state, and a third state. The single load status signal at the first state may indicate that the current load demand handled by the PSU is greater than the first peak efficiency load threshold. Further, the single load status signal at the second state may indicate that the current load demand handled by the PSU is less than the second peak efficiency load threshold. Furthermore, the single load status signal at the third state may indicate that the current load demand handled by the PSU is less than the first peak efficiency load threshold and greater than the second peak efficiency load threshold. The elements depicted in FIG. 5 may also be interchangeable with other elements of FIGS. 1-4 and 6-10 as required to realize a particularly desired embodiment.

Figure 6:
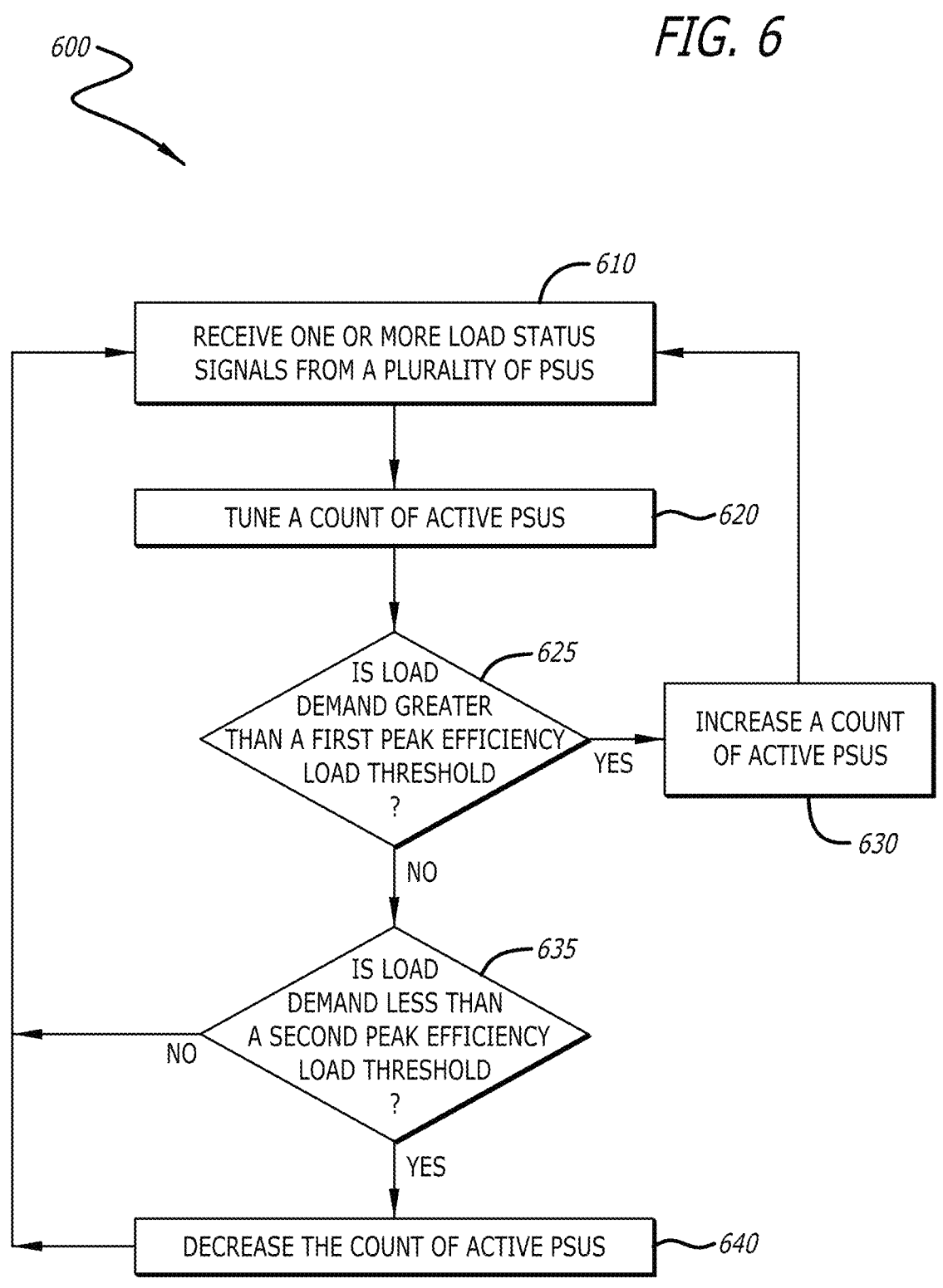
FIG. 6 is a flowchart showing a process for tuning a count of active PSUs in accordance with various embodiments of the disclosure.

Referring to FIG. 6, a flowchart showing a process 600 for tuning a count of active PSUs in accordance with various embodiments of the disclosure. In many embodiments, the process 600 may receive one or more load status signals from a plurality of PSUs (block 610). In a variety of embodiments, the one or more load status signals may be configured to indicate a load demand. For example, the one or more load status signals may indicate whether the plurality of PSUs are experiencing a high load demand, a low load demand, or an optimal load demand. In a number of embodiments, the one or more load status signals may include a high-load signal and a low-load signal. The high-load signal can have a first state or a second state and the low-load signal can have a third state or a fourth state based on the load demand. In numerous embodiments, each of the plurality of PSUs may be configured to generate the one or more load status signals to indicate the load demand being handled by the corresponding PSU.

In more embodiments, the process 600 may tune a count of active PSUs (block 620). In further embodiments, a PSU may be operable in one of at least two modes, for example, an active mode and a standby mode. In the active mode, a PSU may be capable of supplying power while the standby mode the PSU may not supply power. The active PSUs may include one or more PSUs that are operating in the active mode. In still more embodiments, the process 600 may tune the count of active PSUs based on the one or more load status signals.

In additional embodiments, the process 600 may determine whether the load demand is greater than a first peak efficiency load threshold (block 625). In still further embodiments, the first peak efficiency load threshold may define an upper limit of a peak efficiency load threshold range associated with the plurality of PSUs. In still additional embodiments, the process 600 may determine whether the load demand is greater than the first peak efficiency load threshold based on the one or more load signals, for example, the high-load signal.

In yet more embodiments, if the load demand is greater than the first peak efficiency load threshold, the process 600 may increase the count of active PSUs (block 630) and then continue to receive the one or more load status signals from the plurality of PSUs (block 610). In still yet more embodiments, the high-load signal at the second state may indicate that the load demand is greater than the first peak efficiency load threshold. Since the load demand is shared among active PSUs, any increase in the count of active PSUs may redistribute the load demand among previously active PSUs and the newly activated PSU. Consequently, the load handled per active PSU may decrease. In many further embodiments, the process 600 may trigger multiple standby PSUs to operate in the active mode in one iteration.

In many additional embodiments, if the load demand is less than the first peak efficiency load threshold, the process 600 may determine whether the load demand is less than a second peak efficiency load threshold (block 635). The second peak efficiency load threshold may define a lower limit of the peak efficiency load threshold range associated with the plurality of PSUs. In still yet further embodiments, the process 600 may determine whether the load demand is less than the second peak efficiency load threshold based on the one or more load signals, for example, the low-load signal.

In still yet additional embodiments, if the load demand is greater than the second peak efficiency load threshold, the process 600 may not change the count of active PSUs and may continue to receive the one or more load status signals from the plurality of PSUs (block 610). The low-load signal at the third state may indicate that the load demand is greater than the second peak efficiency load threshold. However, in still yet further embodiments, if the load demand is less than the second peak efficiency load threshold, the process 600 may decrease the count of active PSUs (block 640) and then continue to receive the one or more load status signals from the plurality of PSUs (block 610). The low-load signal at the fourth state may indicate that the load demand is less than the second peak efficiency load threshold. Since the load demand is shared among active PSUs, any decrease in the count of active PSUs may redistribute the load demand among remaining active PSUs. Consequently, the load handled per active PSU may increase. In several embodiments, the process 600 may trigger multiple active PSUs to operate in the standby mode in one iteration.

Although a specific embodiment for a process 600 for tuning the count of active PSUs suitable for carrying out the various steps, processes, methods, and operations described herein is discussed with respect to FIG. 6, any of a variety of systems and/or processes may be utilized in accordance with embodiments of the disclosure. For example, in several more embodiments, the plurality of PSUs may be of varying power handling capacities and can be associated with different peak efficiency threshold ranges. In such a scenario, tuning the count of active PSUs can further involve switching a low-capacity active PSU to operate in the standby mode if its load demand becomes greater than corresponding first peak efficiency load threshold and switching a high-capacity standby PSU to operate in the active mode, e.g., take over. Tuning the count of active PSUs can further include switching a high-capacity active PSU to operate in the standby mode if its load demand becomes less than corresponding second peak efficiency load threshold and switching a low-capacity standby PSU to operate in the active mode, e.g., take over. In other words, tuning active PSUs may include using different combinations of active PSUs with varying power handling capacities while maintaining the same overall number of active PSUs. The elements depicted in FIG. 6 may also be interchangeable with other elements of FIGS. 1-5 and 7-10 as required to realize a particularly desired embodiment.

Figure 7:
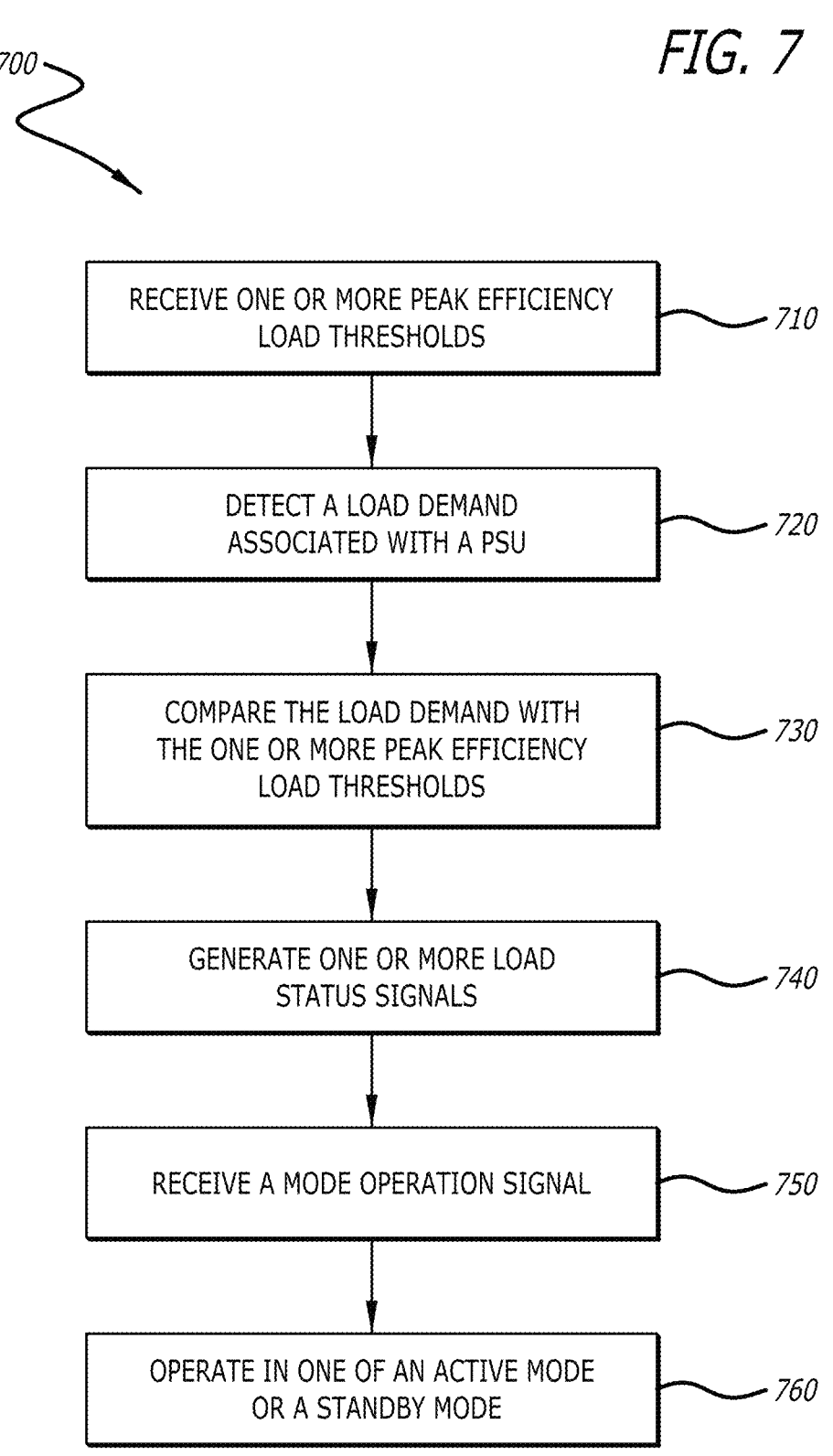
FIG. 7 is a flowchart showing a process for generating one or more load status signals by a PSU in accordance with various embodiments of the disclosure.

Referring to FIG. 7, a flowchart showing a process 700 for generating one or more load status signals by a PSU in accordance with various embodiments of the disclosure. In many embodiments, the process 700 may receive one or more peak efficiency load thresholds (block 710). In numerous embodiments, the one or more peak efficiency load thresholds may be set based on one or more configuration parameters (e.g., aging, environmental conditions, power handling capacity, regulatory constraints, or the like) of a PSU in a network device. In still other embodiments, the one or more peak efficiency load thresholds can be stored in a memory associated with the PSU. In numerous additional embodiments, the one or more peak efficiency load thresholds may define a peak efficiency load threshold range of the PSU. For example, the one or more peak efficiency load thresholds may include a first peak efficiency load threshold that defines an upper limit of the peak efficiency load threshold range and a second peak efficiency load threshold that defines a lower limit of the peak efficiency load threshold.

In a number of embodiments, the process 700 may detect a load demand associated with the PSU (block 720). In a variety of embodiments, the process 700 can detect the load demand based on various mechanisms, for example, voltage and current sensing over a power bus connected to the PSU, thermal sensing, adaptive control algorithms, utilizing current sense resistors, or the like. In further embodiments, the load demand may correspond to a real-time load demand or a near-real-time load demand associated with the PSU.

In a variety of embodiments, the process 700 may compare the load demand with the one or more peak efficiency load thresholds (block 730). For example, the process 700 may compare the load demand with the one or more peak efficiency load thresholds to determine whether the load demand is high, low, or optimal. In numerous additional embodiments, the process 700 may compare the load demand with the first peak efficiency load threshold and the second peak efficiency load threshold.

In additional embodiments, the process 700 may generate one or more load status signals (block 740). In further embodiments, the process 700 may generate the one or more load status signals based on the comparison of the load demand with the one or more peak efficiency load thresholds. In several embodiments, the one or more load status signals may include a high-load signal and a low-load signal. In still additional embodiments, if the load demand is greater than the first peak efficiency load threshold, the process 700 may assert the high-load signal while the low-load signal may remain de-asserted. In further embodiments, if the load demand is less than the second peak efficiency load threshold, the low-load signal may be asserted while the high-load signal may remain de-asserted. However, if the load demand is less than the first peak efficiency load threshold and greater than the second peak efficiency load threshold, both the high-load signal and the low-load signal may remain de-asserted. In several more embodiments, the process 700 may transmit (or provide) the one or more load status signals to a power manager of the network device.

In more embodiments, the process 700 may receive a mode trigger signal (block 750). For example, the mode trigger signal may be configured to trigger the PSU to operate in of a plurality of modes of operation such as an active mode and a standby mode. In still more embodiments, the mode trigger signal may be received in response to transmitting the one or more load status signals. In yet more embodiments, the mode trigger signal may be received from the power manager of the network device.

In many further embodiments, the process 700 may operate the PSU in one of the active mode or the standby mode (block 760). In many additional embodiments, the process 700 may operate the PSU in one of the active mode or the standby mode based on the mode trigger signal. For example, if the mode trigger signal is asserted, the PSU may be operated in the active mode. However, if the mode trigger signal is de-asserted, the PSU operates in the standby mode.

Although a specific embodiment for tuning the count of active PSUs suitable for carrying out the various steps, processes, methods, and operations described herein is discussed with respect to FIG. 7, any of a variety of systems and/or processes may be utilized in accordance with embodiments of the disclosure. For example, in many additional embodiments, the one or more peak efficiency load thresholds can be dynamically programmed based on mode oscillation information associated with the PSU. The elements depicted in FIG. 7 may also be interchangeable with other elements of FIGS. 1-6 and 8-10 as required to realize a particularly desired embodiment.

Figure 8:
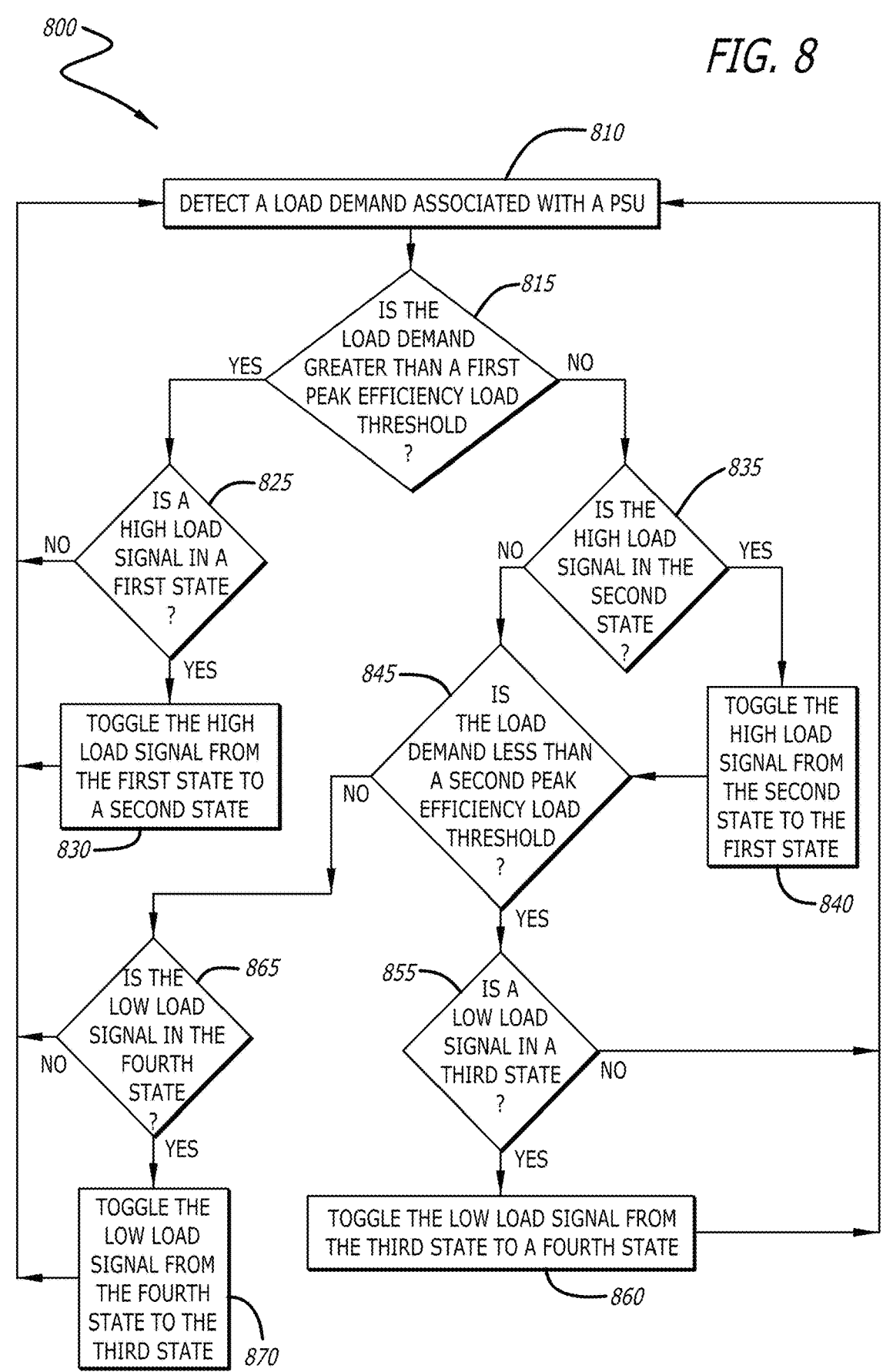
FIG. 8 is a flowchart showing a process for generating one or more load status signals by a PSU in accordance with various embodiments of the disclosure.

Referring to FIG. 8, a flowchart showing a process 800 for generating one or more load status signals by a PSU in accordance with various embodiments of the disclosure. In a number of embodiments, the process 800 may detect a load demand associated with a PSU (block 810). The PSU may be included in a network device, for example, a switch, a router, an access point, a hub, a server, or any other network device. In many embodiment, the process 800 can detect the load demand based on various mechanisms, for example, voltage and current sensing over a power bus connected to the PSU, thermal sensing, adaptive control algorithms, utilizing current sense resistors, or the like. The load demand may correspond to a real-time load demand or a near-real-time load demand associated with the PSU.

In numerous embodiments, the process 800 may determine whether the load demand is greater than a first peak efficiency load threshold (block 815). The first peak efficiency load threshold may define an upper limit of a peak efficiency load threshold range associated with the PSU. In more embodiments, the process 800 may compare the load demand with the first peak efficiency load threshold to determine whether the load demand is greater than the first peak efficiency load threshold.

In a variety of embodiments, if the load demand is greater than the first peak efficiency load threshold, the process 800 may determine whether a high-load signal is in a first state (block 825). The high-load signal may be an output signal generated by the PSU to indicate whether the load demand is greater than the first peak efficiency load threshold or less than the first peak efficiency load threshold. For example, the high-load signal in the first state may indicate that the load demand is less than the first peak efficiency load threshold.

In numerous additional embodiments, if the high-load signal is in the first state, the process 800 may toggle the high-load signal from the first state to a second state (block 830). For example, the high-load signal in the second state may indicate that the load demand is greater than the first peak efficiency load threshold. Once the high-load signal is transitioned (e.g., toggled) to the second state, the process 800 can again detect the load demand (block 810). However, if the high-load signal is already in the second state, the process 800 may continue to detect the load demand (block 810).

In yet more embodiments, if the load demand is less than the first peak efficiency load threshold, the process 800 may determine whether the high-load signal is in the second state (block 835). In still more embodiments, if the high-load signal is in the second state, the process 800 may toggle the high-load signal from the second state to the first state (block 840). Toggling of the high-load signal from the second state to the first state may indicate that the load demand has become less than the first peak efficiency load threshold.

In further embodiments, if the high-load signal is not in the second state, the process 800 may further determine whether the load demand is less than a second peak efficiency load threshold (block 845). The second peak efficiency load threshold may define a lower limit of the peak efficiency load threshold range associated with the PSU. In many embodiments, the process 800 may compare the load demand with the second peak efficiency load threshold to determine whether the load demand is less than the second peak efficiency load threshold.

In several embodiments, if the load demand is less than the second peak efficiency load threshold, the process 800 may determine if a low-load signal is in a third state (block 855). The low-load signal may be an output signal generated by the PSU to indicate whether the load demand is less than the second peak efficiency load threshold or greater than the second peak efficiency load threshold. For example, the low-load signal in the third state may indicate that the load demand is greater than the second peak efficiency load threshold.

In several more embodiments, if the low-load signal is in the third state, the process 800 may toggle the low-load signal from the third state to the fourth state (block 860). The low-load signal in the fourth state may indicate that the load demand is less than the second peak efficiency load threshold. Once the low-load signal is transitioned (e.g., toggled) to the fourth state, the process 800 can again detect the load demand (block 810). However, in additional embodiments, if the low-load signal is in the fourth state, the process 800 may continue to detect the load demand (block 810).

In many additional embodiments, if the load demand is more than the second peak efficiency load threshold, the process 800 may determine whether the low-load signal is in the fourth state (block 865). In many further embodiments, if the low-load signal is in the fourth state, the process 800 may toggle the low-load signal from the fourth state to the third state (block 870). Toggling of the low-load signal from the fourth state to the third state may indicate that the load demand has become greater than the second peak efficiency load threshold and the process 800 may continue detecting the load demand (block 810). However, if the low-load signal is already in the third state, the process 800 may continue detecting the load demand associated with the PSU (810).

Although a specific embodiment for transitioning of one or more load status signal based on a state of operation suitable for carrying out the various steps, processes, methods, and operations described herein is discussed with respect to FIG. 8, any of a variety of systems and/or processes may be utilized in accordance with embodiments of the disclosure. For example, in still further embodiments, the process 800 may utilize one or more machine learning models to detect the load demand. The elements depicted in FIG. 8 may also be interchangeable with other elements of FIGS. 1-7, 9, and 10 as required to realize a particularly desired embodiment.

Figure 9:
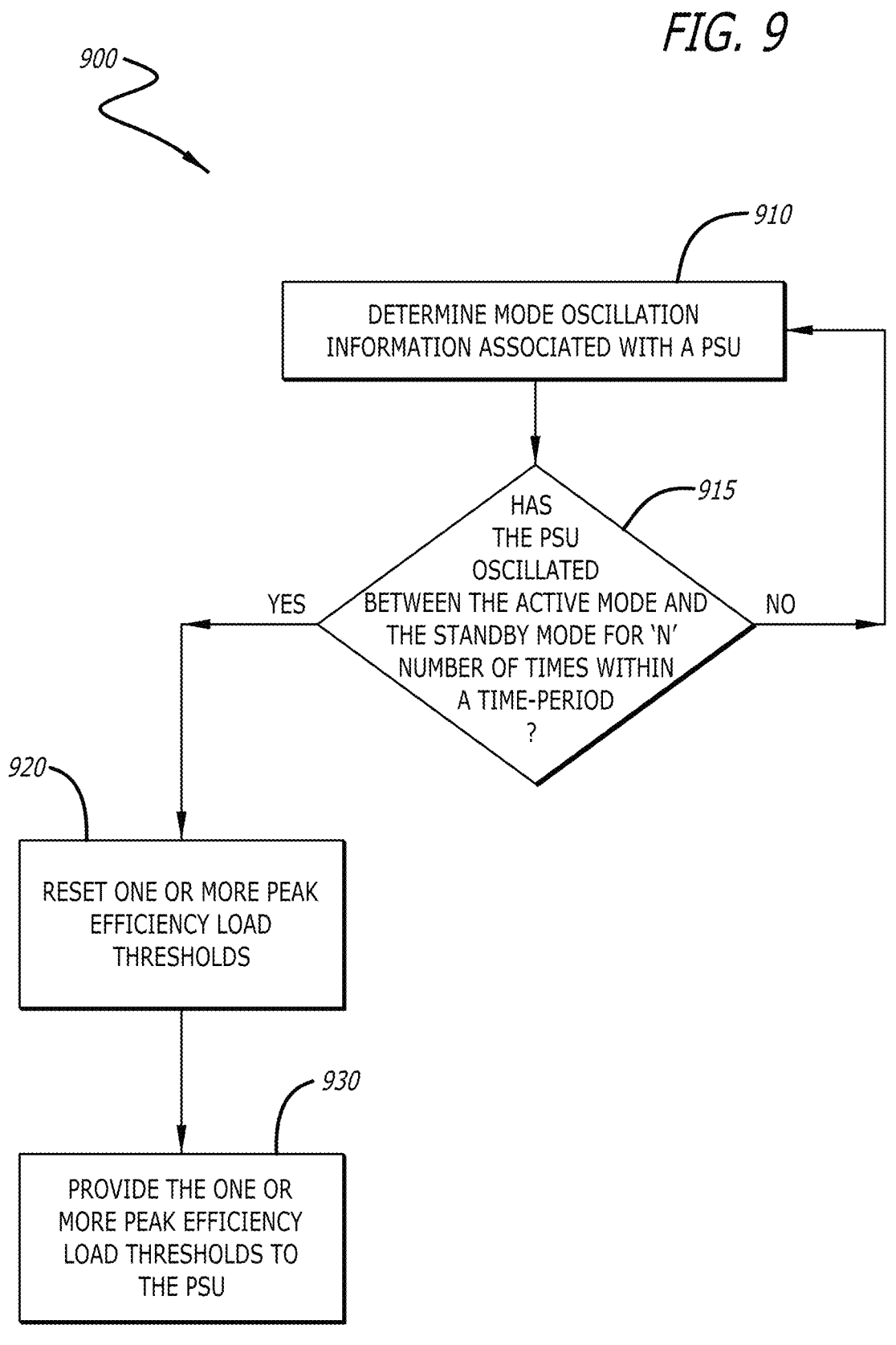
FIG. 9 is a flowchart showing a process for resetting peak efficiency load thresholds in a PSU in accordance with various embodiments of the disclosure.

Referring to FIG. 9, a flowchart showing a process 900 for resetting peak efficiency load thresholds in a PSU in accordance with various embodiments of the disclosure is shown. In many embodiments, the process 900 may determine mode oscillation information associated with a PSU (block 910). In numerous embodiments, the PSU may be included in a network device, for example, a router, a switch, a hub, an access point, a server, a Graphics Processing Unit (GPU), a network node, or the like. In additional embodiments, the mode oscillation information of the PSU may indicate a number of times the PSU has oscillated between an active mode and a standby mode within a set time-period.

In a number of embodiments, the process 900 may determine whether the PSU has oscillated between the active mode and the standby mode for 'n' number of times within a time-period (block 915). In numerous additional embodiments, a PSU can be toggled between the active mode and the standby mode to dynamically control the total available power of the network device in accordance with varying load demand. In other words, the process 900 may determine whether an oscillation frequency of the PSU is greater than or equal to 'n'.

In more embodiments, if the PSU has oscillated between the active mode and the standby mode for 'n' number of times within the time-period, the process 900 may reset one or more peak efficiency load thresholds (block 920). In several embodiments, the one or more peak efficiency load thresholds may be configured to define a peak efficiency load threshold range of the PSU. In several more embodiments, the peak efficiency load threshold range of a PSU may refer to a specific load range within which the PSU operates at its highest efficiency. The one or more peak efficiency load thresholds may include a first peak efficiency load threshold and a second peak efficiency load threshold. For example, an upper limit of the peak efficiency load threshold range may be defined by the first peak efficiency load threshold and a lower limit of the peak efficiency load threshold range may be defined by the second peak efficiency load threshold. In still more embodiments, 'n' may define a mode oscillation threshold value which when breached may result in resetting the one or more peak efficiency load thresholds for the PSU. For example, if the PSU oscillates between the active mode and the standby mode for more than 'n' times within the time-period (e.g., 1 minute, 5 minutes, 1 hour, etc.), the process 900 may determine that the first and second peak efficiency load thresholds are in close proximity and need to be reset. In yet more embodiments, the process 900 may update the first and second peak efficiency load thresholds to increase a separation between the first and second peak efficiency load thresholds. For example, the process 900 may increase the first peak efficiency load threshold, decrease the second peak efficiency load threshold, or a combination thereof to increase the separation between the first and second peak efficiency load thresholds.

In further embodiments, the process 900 may provide the one or more peak efficiency load thresholds to the PSU (block 930). In further additional embodiments, the one or more peak efficiency load thresholds may be utilized by the PSU to generate one or more load status signals for indicating load demand. In still yet additional embodiments, the process 900 may provide the updated one or more peak efficiency load thresholds to that PSU which had oscillated between the active mode and the standby mode for more than 'n' times within the time-period. However, in further additional embodiments, if the PSU has not oscillated between the active mode and the standby mode for at 'n' number of times within the time-period, the process 900 may again determine the mode oscillation information associated with the PSU (block 910).

Although a specific embodiment for resetting peak efficiency load thresholds in a PSU suitable for carrying out the various steps, processes, methods, and operations described herein is discussed with respect to FIG. 9, any of a variety of systems and/or processes may be utilized in accordance with embodiments of the disclosure. For example, in still yet further embodiments, the process 900 may provide the updated one or more peak efficiency load thresholds to multiple PSUs in the network device. The elements depicted in FIG. 9 may also be interchangeable with other elements of FIGS. 1-8 and 10 as required to realize a particularly desired embodiment.

Figure 10:
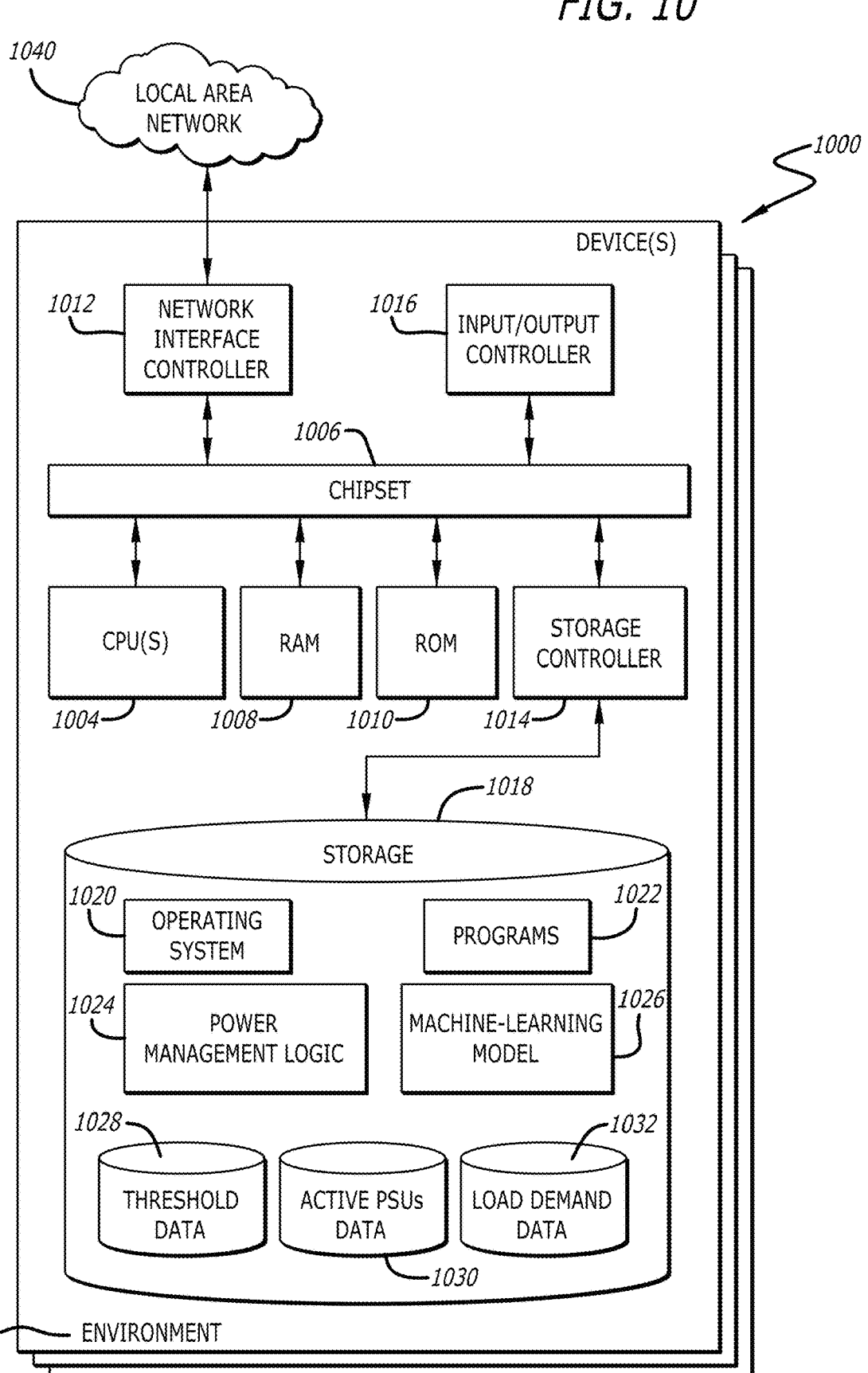
FIG. 10 is a conceptual block diagram of a device suitable for configuration with a power management logic, in accordance with various embodiments of the disclosure.

Referring to FIG. 10, a conceptual block diagram of a device 1000 suitable for configuration with a power management logic, in accordance with various embodiments of the disclosure is shown. The embodiment of the conceptual block diagram depicted in FIG. 10 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 10 can also illustrate an access point, a switch, or a router in accordance with various embodiments of the disclosure. The device 1000 may, in many nonlimiting examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations necessary for the operation of the device 1000.

In a number of embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1006 may provide an interface between the processor(s) 1004 and the remainder of the components and devices within the environment 1002. The chipset 1006 can provide an interface to a random-access memory ("RAM") 1008, which can be used as the main memory in the device 1000 in some embodiments. The chipset 1006 can further be configured to provide an interface to a computer-readable storage medium such as a read-only memory ("ROM") 1010 or non-volatile RAM ("NVRAM") for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Additional embodiments of the device 1000 can be configured to operate in a networked environment using logical connections to remote computing devices and computer systems through a network, such as the network 1040. The chipset 1006 can include functionality for providing network connectivity through a network interface card ("NIC") 1012, which may comprise a gigabit Ethernet adapter or similar component. The NIC 1012 can be capable of connecting the device 1000 to other devices over the network 1040. It is contemplated that multiple NICs 1012 may be present in the device 1000, connecting the device to other types of networks and remote systems.

In further embodiments, the device 1000 can be connected to a storage 1018 that provides non-volatile storage for data accessible by the device 1000. The storage 1018 can, for instance, store an operating system 1020, applications 1022, threshold data 1028, active PSU data 1030, and load demand data 1032 which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1000 can store data within the storage 1018 by transforming the physical state of the physical storage units to reflect the information being stored. The specific transformation of the physical state can depend on various factors. Examples of such factors can include, but are not limited to, the technology used to implement the physical storage units, whether the storage 1018 is characterized as primary or secondary storage, and the like.

In many more embodiments, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more devices 1000 operating in a cloud-based arrangement. By way of example, and not limitation, computer-readable storage media can include volatile and non-volatile, removable and non-removable media implemented in any method or technology.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In many additional embodiments, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In some embodiments, the device 1000 has access to computer-readable storage media storing computer-executable instructions which, when executed by the device 1000, perform the various processes described above with regard to FIGS. 1-9. In certain embodiments, the device 1000 can also include computer-readable storage media having instructions stored thereupon for performing any of the other computer-implemented operations described herein.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10 and can include other components that are not explicitly shown in FIG. 10 or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform the functions described herein. The virtualization layer may generally support a virtual resource that performs at least a portion of the techniques described herein.

In many further embodiments, the device 1000 may include a power management logic 1024. The power management logic 1024 can be configured to perform one or more of the various steps, processes, operations, and/or other methods that are described above. Often, the power management logic 1024 can be a set of instructions stored within a non-volatile memory that, when executed by the processor(s)/controller(s) 1004 can carry out these steps, etc. In certain embodiments, the power management logic 1024 may perform various operations related to power supply and management within the device 1000 and may determine a load demand handled by the device 1000. The power management logic 1024 may be configured to monitor and assess the load demand to ensure that the device 1000 receives an adequate and stable power supply to function optimally. The power management logic 1024 may be further configured to tune a count of active PSUs (e.g., increase or decrease) within the device 1000 in accordance with varying load demand. Further, the power management logic 1024 may determine and update one or more peak efficiency load thresholds for operating the plurality of PSUs.

In various embodiments, the storage 1018 can include the threshold data 1028. The threshold data 1028 may store values of the one or peak efficiency load thresholds for the plurality of PSUs in the device 1000. The one or peak efficiency load thresholds may be dynamically programmable.

In still more embodiments, the storage 1018 can include the active PSU data 1030. The active PSU data 1030 may store a count of PSU operating in an active mode and a count of PSUs operating in a standby mode. In other words, the active PSU data 1030 may be indicative of which all PSUs (e.g., indicated by PSU identifier) were operating the active mode and standby mode at any given point of time in the past.

In a number of embodiments, the storage 1018 can include load demand data 1032. The load demand data 1032 may store load demand associated with the device 1000. Further, the load demand data 1032 may indicate load demand handled by each PSU in the past. Thus, by referring to the load demand data 1032, the power management logic

1024 may determine which all PSUs were operated outside the peak efficiency load range in the past.

Finally, in numerous additional embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more linear regression models, logistic regression models, decision trees, Naïve Bayes models, neural networks, k-means cluster models, random forest models, and/or other types of ML models 1026. The ML model(s) 1026 can be configured to generate inferences to make predictions or draw conclusions from data. An inference can be considered the output of a process of applying a model to new data. This can occur by learning from at least the threshold data 1028, the active PSU data 1030, and the load demand data 1032, and utilize the learning to predict future outcomes. For example, the ML model(s) 1026 can be trained to predict load demand. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1026 may be generated by human/administrator verifications or may compare predicted outcomes with actual outcomes.

Although a specific embodiment for a device suitable for configuration with a dynamic proxying logic for carrying out the various steps, processes, methods, and operations described herein is discussed with respect to FIG. 10, any of a variety of systems and/or processes may be utilized in accordance with embodiments of the disclosure. For example, the device may be in a virtual environment such as a cloud-based network administration suite, or it may be distributed across a variety of network devices or switches. The elements depicted in FIG. 10 may also be interchangeable with other elements of FIGS. 1-9 as required to realize a particularly desired embodiment.

Although a specific embodiment for a conceptual block diagram of the device 1000 suitable for configuration with the power management logic suitable for carrying out the various steps, processes, methods, and operations described herein is discussed with respect to FIG. 10, any of a variety of systems and/or processes may be utilized in accordance with embodiments of the disclosure. For example, the device may be in a virtual environment such as a cloud-based network administration suite, or it may be distributed across a variety of network devices or switches. The elements depicted in FIG. 10 may also be interchangeable with other elements of FIGS. 1-9 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
a plurality of power supply units (PSUs), each operable in one of an active mode or a standby mode;
a memory communicatively coupled to the processor; and
a power management logic that is configured to:
  receive one or more load status signals from the plurality of PSUs, wherein the one or more load status signals are configured to indicate a load demand;
  tune a count of active mode PSUs among the plurality of PSUs based on the one or more load status signals;
  determine whether a PSU from plurality of PSUs has oscillated between the active mode and the standby mode for 'n' number of times within a time-period; and
  reset a peak efficiency load threshold in response to the PSU oscillating between the active mode and the standby mode for 'n' number of times within the time-period;
  wherein the PSU is toggled between the active mode and the standby mode to dynamically control total available power of the device in accordance with load demand.

2. The device of claim 1, wherein tuning the count of active mode PSUs include one of:
increasing the count of active mode PSUs, or
decreasing the count of active mode PSUs.

3. The device of claim 2, wherein the count of active mode PSUs is increased based on the one or more load status signals indicating that the load demand is greater than a peak efficiency load threshold.

4. The device of claim 2, wherein the count of active mode PSUs is decreased based on the one or more load status signals indicating that the load demand is less than a peak efficiency load threshold.

5. The device of claim 1, wherein the load demand corresponds to a real-time load demand or a near-real-time load demand.

6. The device of claim 5, wherein the one or more load status signals include at least one of a high-load signal or a low-load signal.

7. The device of claim 6, wherein the high-load signal is configured to indicate that the real-time load demand or the near-real-time load demand is greater than a peak efficiency load threshold.

8. The device of claim 6, wherein the low-load signal is configured to indicate that the real-time load demand or the near-real-time load demand is less than a peak efficiency load threshold.

9. The device of claim 6, wherein to tune the count of active mode PSUs, the power management logic is further configured to:
  detect that the high-load signal has transitioned from a first state to a second state; and
  trigger, in response to the high-load signal transitioning from the first state to the second state, at least one active PSU among the plurality of PSUs to operate in the active mode.

10. The device of claim 6, wherein to tune the count of active mode PSUs, the power management logic is further configured to:
  detect that the low-load signal has transitioned from a first state to a second state; and
  trigger, in response to the low-load signal transitioning from the first state to the second state, at least one active PSU among the plurality of PSUs to operate in the standby mode.

11. The device of claim 1, wherein the power management logic is further configured to provide the one or more peak efficiency load thresholds to the plurality of PSUs.

12. The device of claim 1, wherein the one or more peak efficiency load thresholds are configured to define a peak efficiency load threshold range.

13. The device of claim 1, wherein the plurality of PSUs is associated with unique one or more peak efficiency load thresholds.

14. A device, comprising:
a processor; and
a memory communicatively coupled to the processor, wherein the memory comprises a power management logic that is configured to:
  generate one or more load status signals based on a load demand and one or more peak efficiency load thresholds associated with the device;
  receive a mode trigger signal in response to the generation of the one or more load status signals; and
  operate in one of an active mode or a standby mode based on the mode trigger signal;
  determine whether the PSU has oscillated between the active mode and the standby mode for 'n' number of times within a time-period; and
  reset one or more peak efficiency load thresholds in response to the PSU oscillating between the active mode and the standby mode for 'n' number of times within the time-period.

15. The device of claim 14, wherein the power management logic is further configured to receive the one or more peak efficiency load thresholds.

16. The device of claim 14, wherein the one or more peak efficiency load thresholds are dynamically programmable.

17. A method, comprising:

receiving one or more load status signals from a plurality of power supply units (PSUs) in a network device, wherein the one or more load status signals are configured to indicate a load demand; and tuning a count of active mode PSUs among the plurality of PSUs based on the one or more load status signals determining whether a PSU from the plurality of PSUs has oscillated between the active mode and the standby mode for 'n' number of times within a time-period;

resetting one or more peak efficiency load thresholds in response to the PSU oscillating between the active mode and the standby mode for 'n' number of times within the time-period; and toggling the PSU between the active mode and the standby mode to dynamically control a total available power of the network device.

18. The method of claim 17, wherein tuning the count of active mode PSUs includes one of:

increasing the count of active mode PSUs based on the one or more load status signals indicating that the load demand is greater than a first peak efficiency load threshold, or decreasing the count of active mode PSUs based on the one or more load status signals indicating that the load demand is less than a second peak efficiency load threshold.

* * * * *